(12) United States Patent
Tomoda et al.

(10) Patent No.: US 11,017,804 B1
(45) Date of Patent: May 25, 2021

(54) MAGNETIC DISK DEVICE AND METHOD OF SETTING RECORDING CAPACITY

(71) Applicants: Kabushiki Kaisha Toshiba, Tokyo (JP); Toshiba Electronic Devices & Storage Corporation, Tokyo (JP)

(72) Inventors: Yusuke Tomoda, Kawasaki Kanagawa (JP); Tatsuo Nitta, Machida Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/012,306

(22) Filed: Sep. 4, 2020

(30) Foreign Application Priority Data

Jan. 15, 2020 (JP) .............................. JP2020-004290

(51) Int. Cl.
*G11B 20/12* (2006.01)
*G11B 5/56* (2006.01)
*G11B 20/10* (2006.01)
*G11B 5/012* (2006.01)

(52) U.S. Cl.
CPC ............... *G11B 5/56* (2013.01); *G11B 5/012* (2013.01); *G11B 20/10009* (2013.01); *G11B 2020/1238* (2013.01)

(58) Field of Classification Search
CPC .......... G11B 5/3103; G11B 2005/0005; G11B 5/1278; G11B 20/1217; G11B 5/315; G11B 5/012; G11B 20/12; G11B 5/6005; G11B 5/5526; G11B 5/3116; G11B 5/187; G11B 21/083; G11B 2020/108098; G11B 2005/0024
USPC ........................ 360/22, 40, 44, 48, 54, 72.1
See application file for complete search history.

(56) References Cited

U.S. PATENT DOCUMENTS

| 5,955,877 A | 9/1999 | Farnworth et al. |
| 9,542,306 B2 | 1/2017 | Kowles |
| 9,607,631 B2 * | 3/2017 | Rausch ............. G11B 20/1833 |
| 10,318,173 B2 | 6/2019 | Ooi et al. |

FOREIGN PATENT DOCUMENTS

| JP | 2003-150445 A | 5/2003 |
| JP | 2005-11463 A | 1/2005 |

* cited by examiner

*Primary Examiner* — Nabil Z Hindi
(74) *Attorney, Agent, or Firm* — White & Case LLP

(57) ABSTRACT

According one embodiment, a magnetic disk device includes a disk including a first region and a second region to which data before written to the first region is temporarily written, a head which writes data to the disk and reads data from the disk, and a controller which selectively performs conventional magnetic recording for writing a track at an interval in a radial direction of the disk and shingled magnetic recording for writing a track so as to overlap in the radial direction, and changes a cache data capacity of data which can be written to the second region in accordance with a first write capacity of data which can be written to the first region by the shingled magnetic recording.

20 Claims, 19 Drawing Sheets

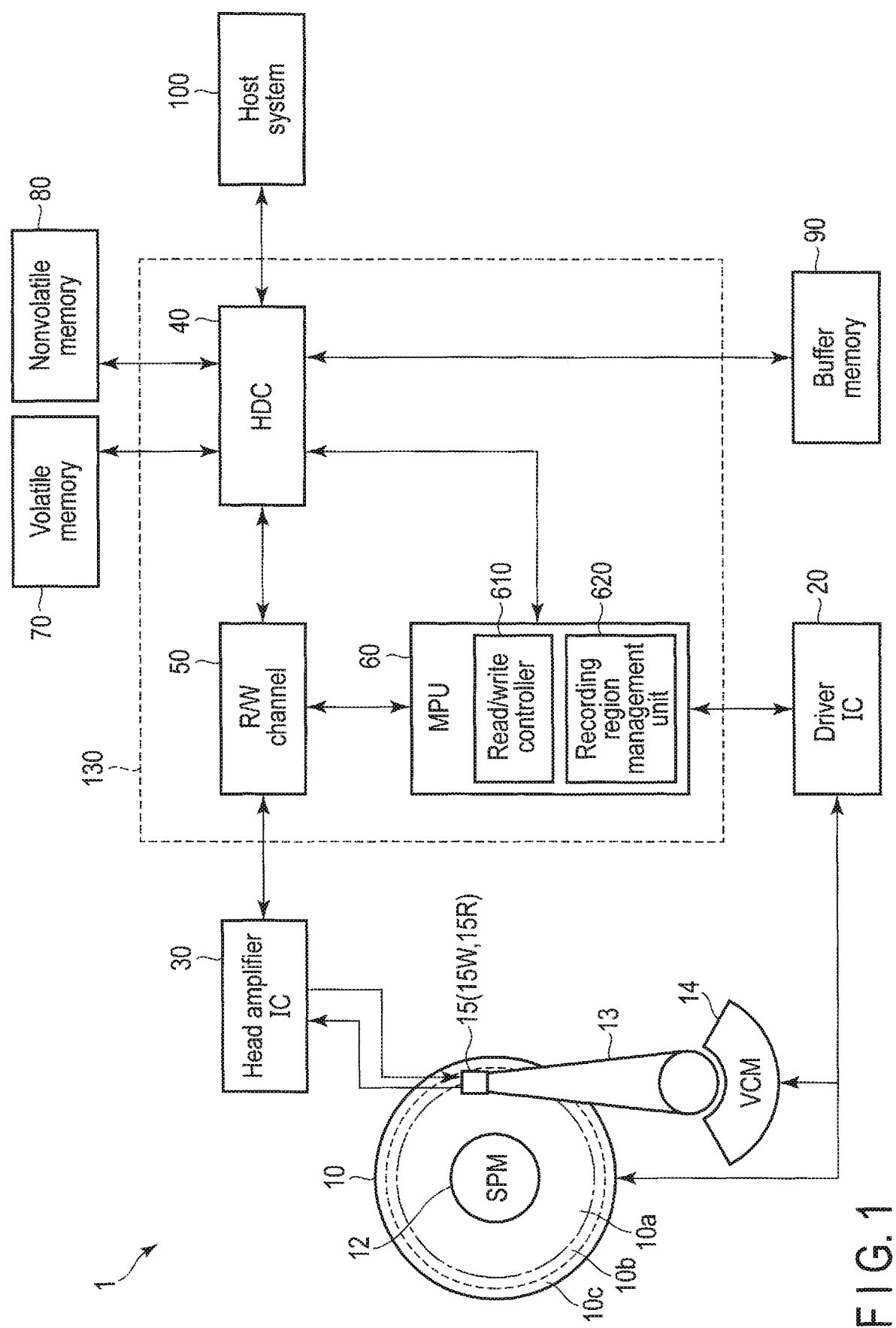
F I G. 1

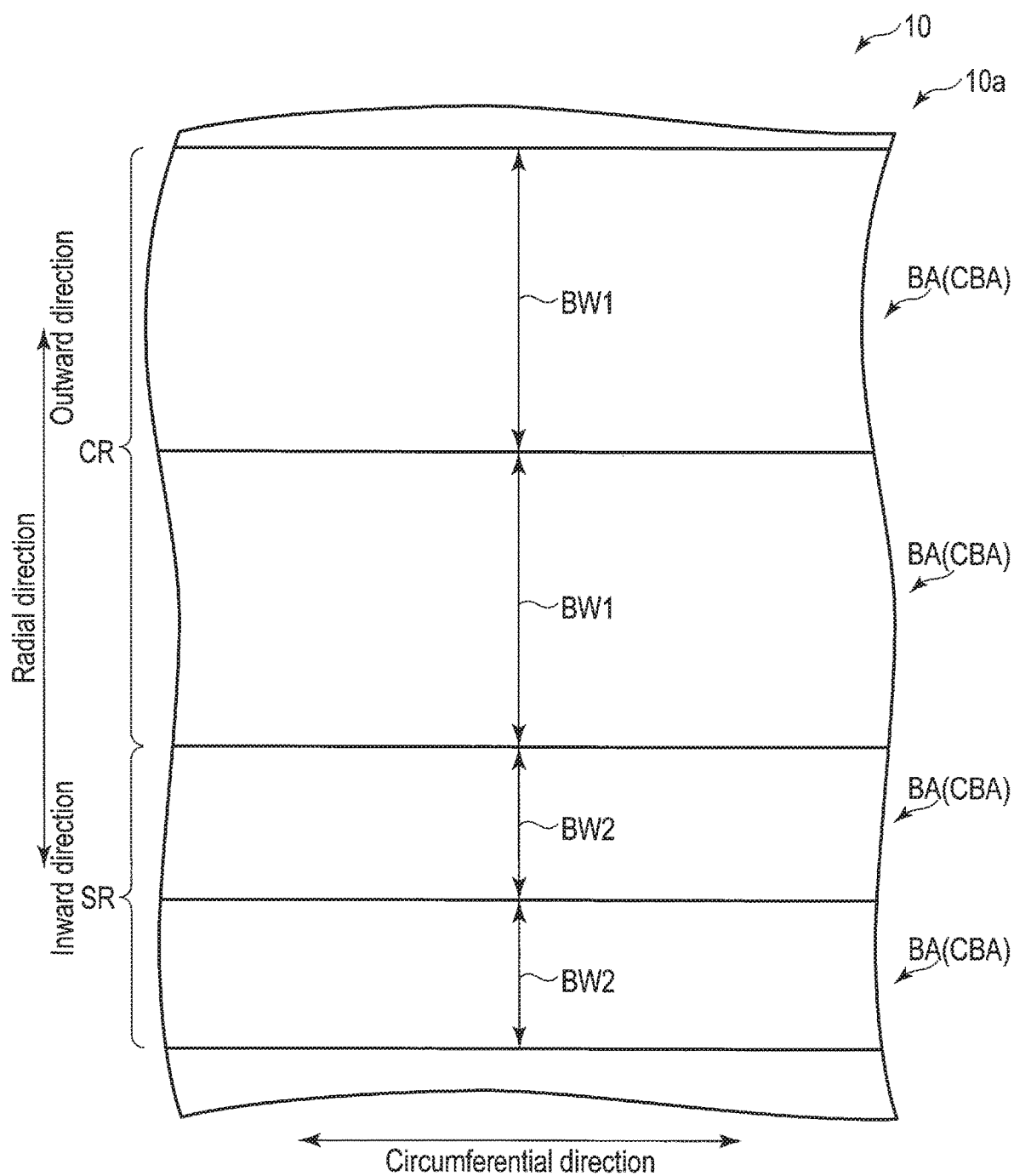
F I G. 5

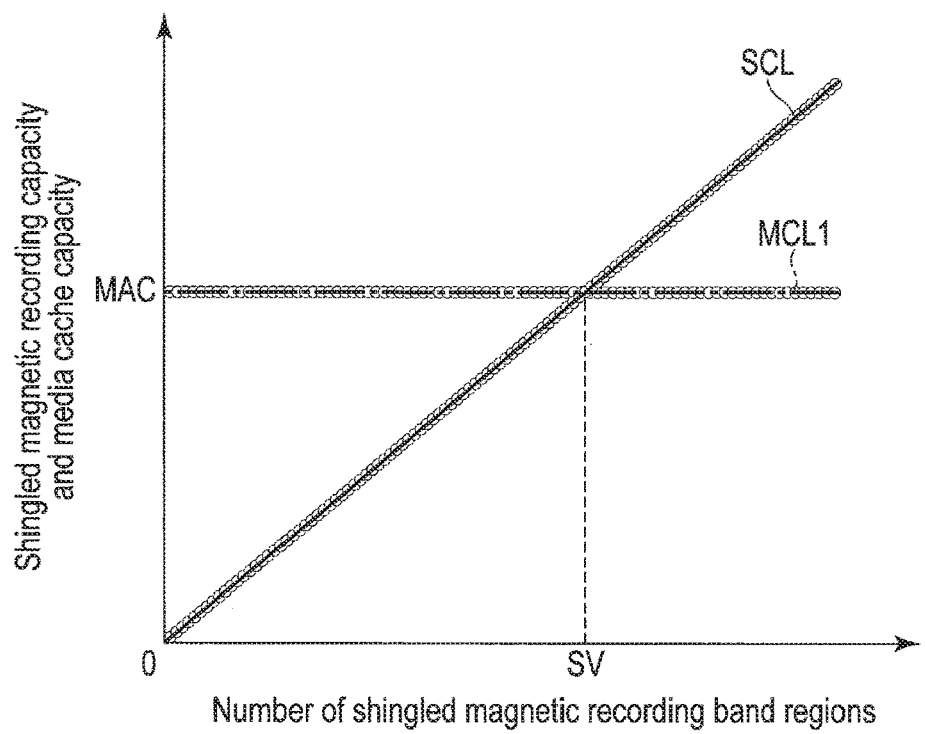
F I G. 7
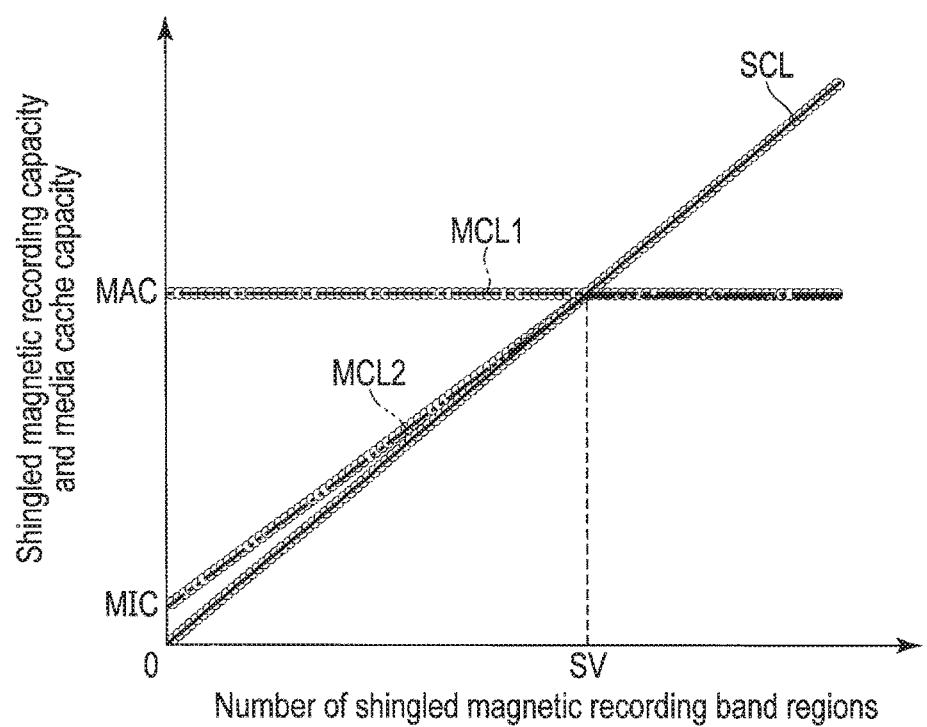
F I G. 8

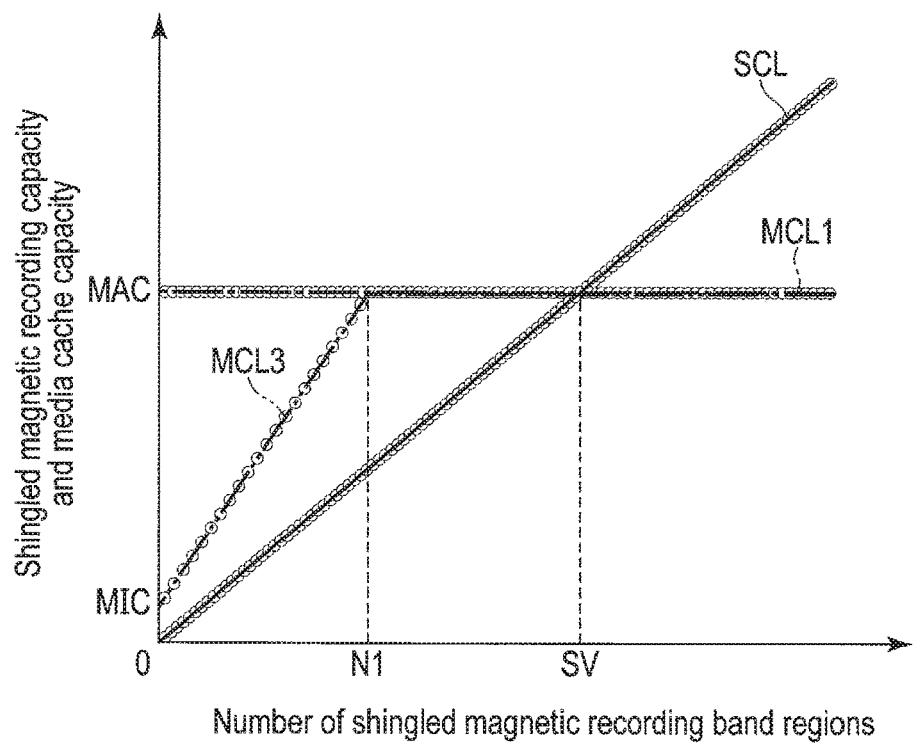
F I G. 9
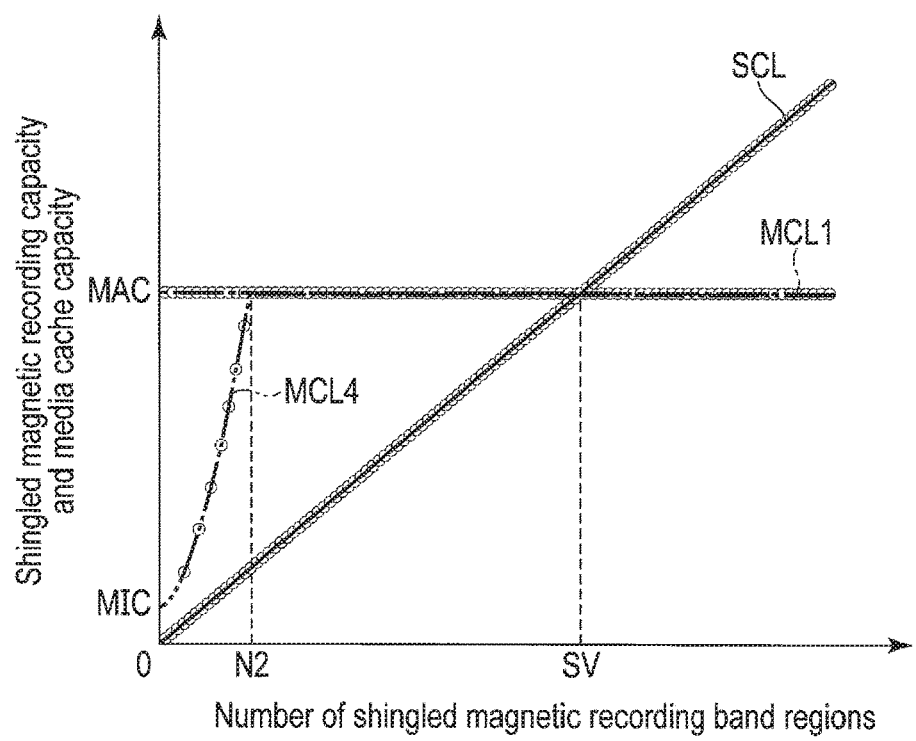
F I G. 10

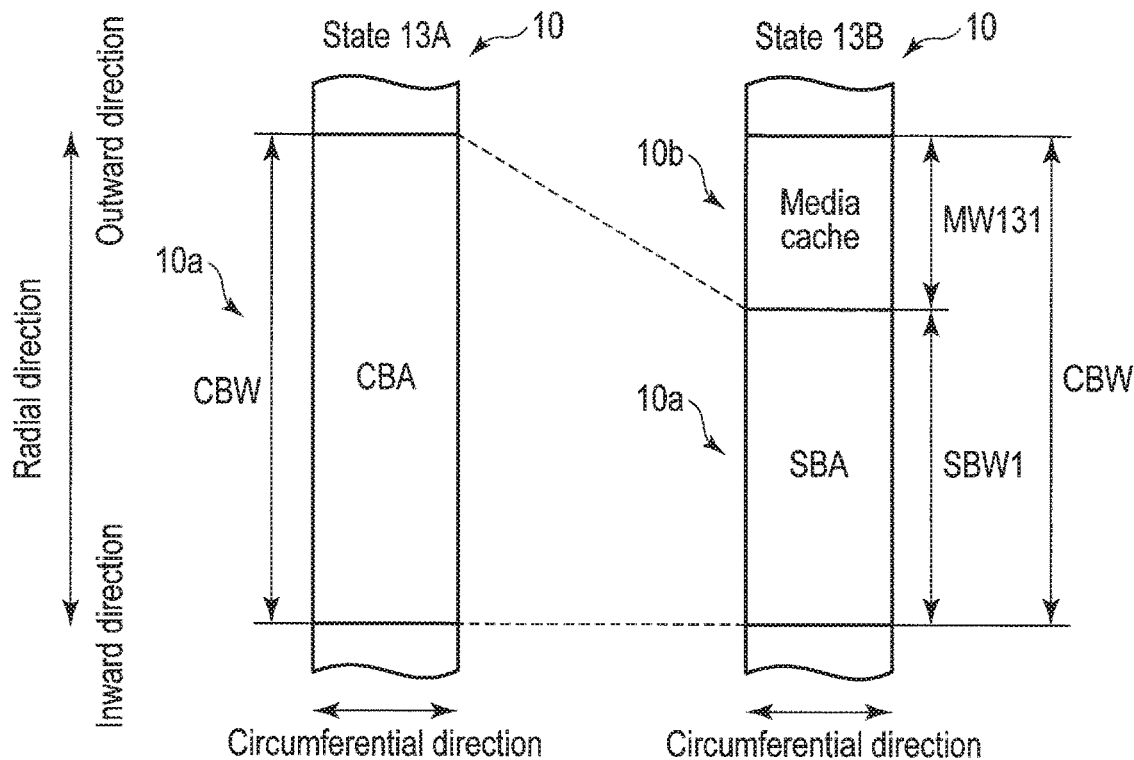
F I G. 13
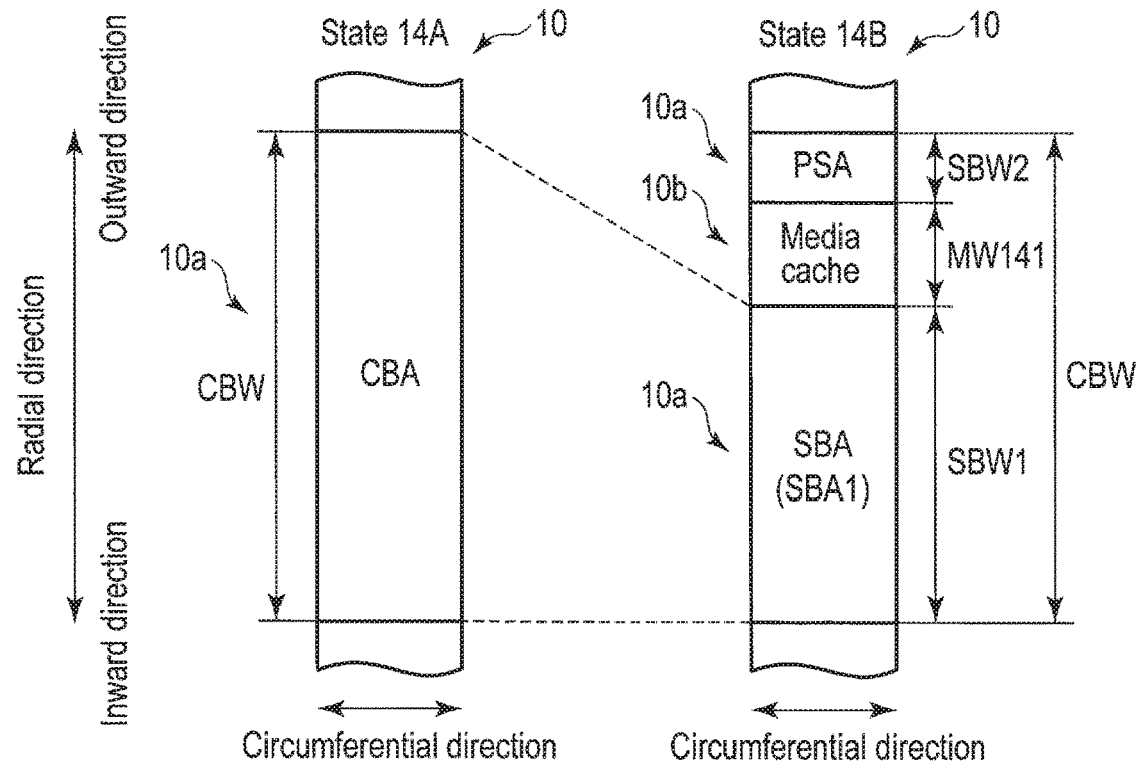
F I G. 14

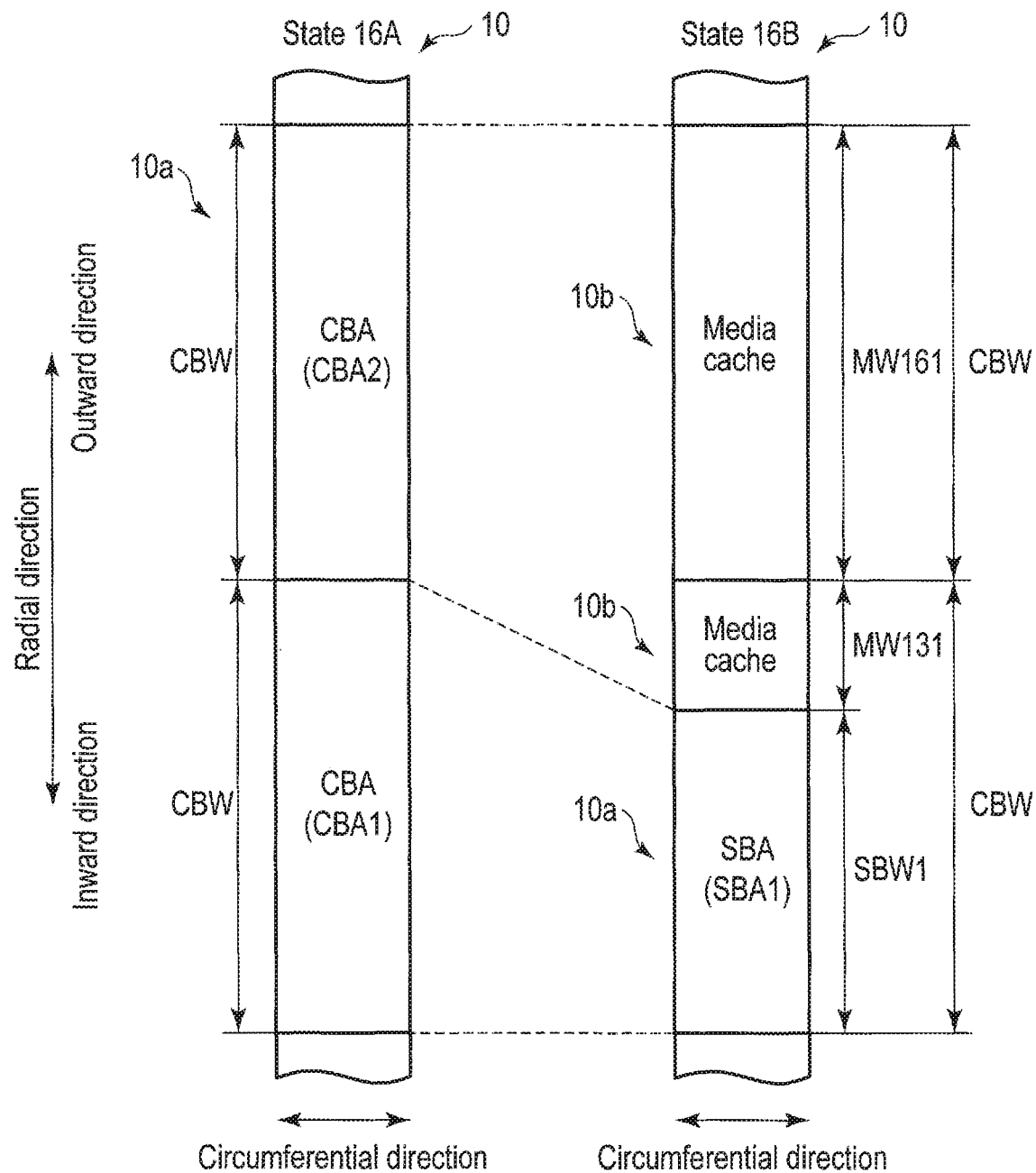
F I G. 16

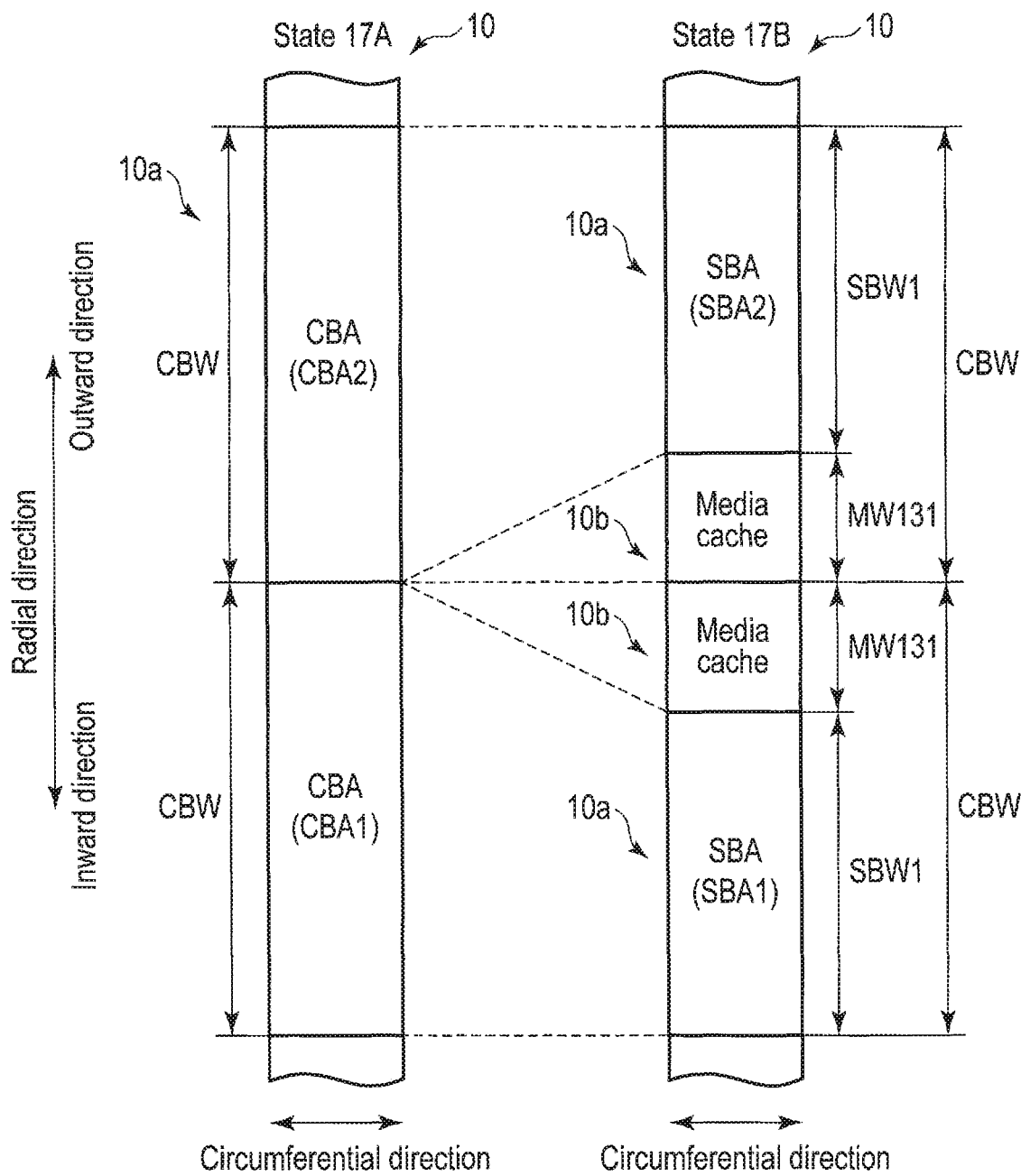
F I G. 17

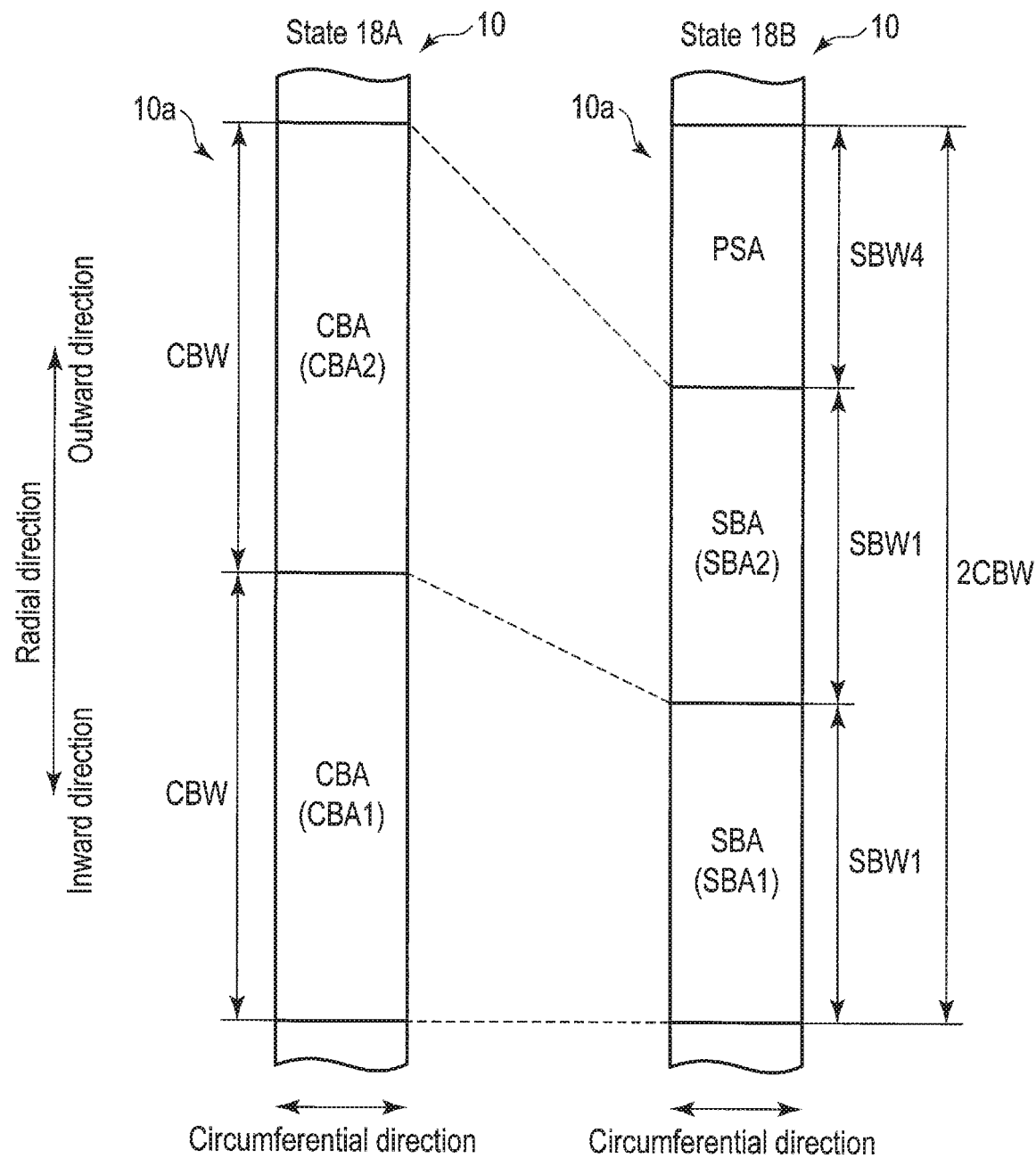
F I G. 18

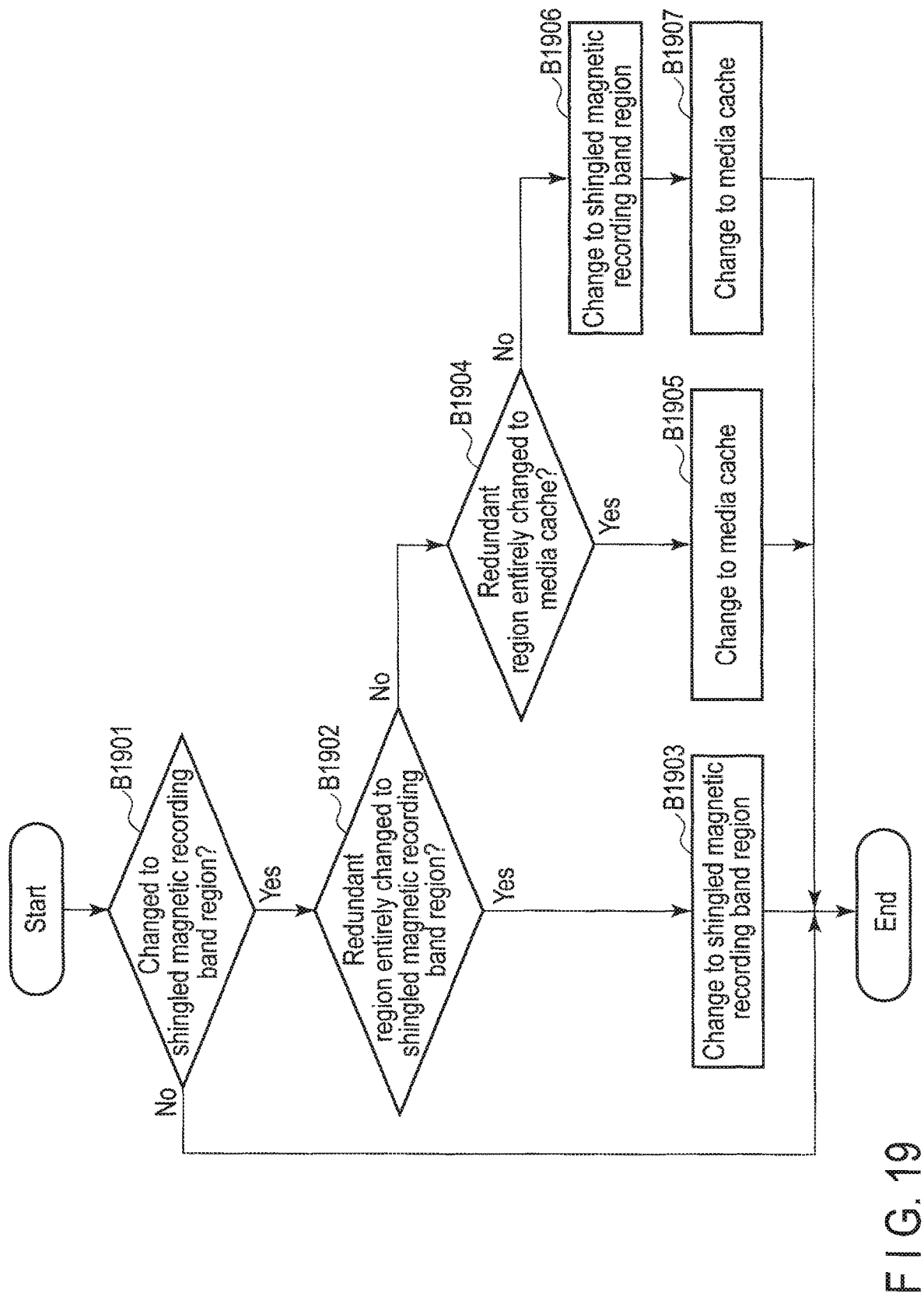
F I G. 19

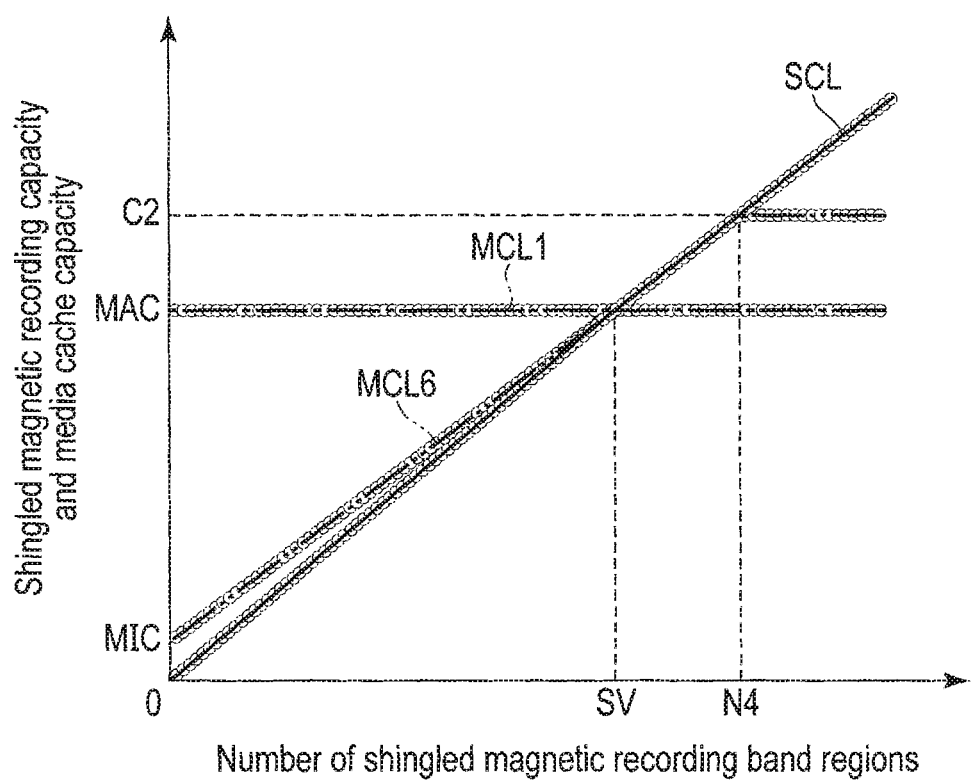
F I G. 21

… (US 11,017,804 B1)

MAGNETIC DISK DEVICE AND METHOD OF SETTING RECORDING CAPACITY

CROSS-REFERENCE TO RELATED APPLICATIONS

This application is based upon and claims the benefit of priority from Japanese Patent Application No. 2020-004290, filed Jan. 15, 2020, the entire contents of which are incorporated herein by reference.

FIELD

Embodiments described herein relate generally to a magnetic disk device and a method of setting a recording capacity.

BACKGROUND

In recent years, a magnetic disk device comprising a technology for realizing high recording density has been developed. One of magnetic disk devices for realizing high recording density is a magnetic disk device using shingled magnetic recording (SMR) or shingled write recording (SWR) in which a plurality of tracks are written so as to overlap each other in the radial direction of a disk. A magnetic disk device which can selectively perform conventional magnetic recording in which a plurality of tracks are written at intervals in the radial direction of a disk and shingled magnetic recording is also present. To temporarily save data or perform refresh write when data is written to a disk by shingled magnetic recording, a magnetic disk device which can selectively perform conventional magnetic recording and shingled magnetic recording requires a media cache having a capacity greater than the capacity required when data is written to a disk by conventional magnetic recording.

BRIEF DESCRIPTION OF THE DRAWINGS

FIG. 1 is a block diagram showing the configuration of a magnetic disk device according to a fist embodiment.

FIG. 5 is a schematic diagram showing examples of a conventional magnetic recording region and a shingled magnetic recording region.

FIG. 7 is a schematic diagram showing an example of the change in shingled magnetic recording capacity with respect to the number of shingled magnetic recording band regions and the change in media cache capacity with respect to the number of shingled magnetic recording band regions.

FIG. 8 is a schematic diagram showing an example of the change in shingled magnetic recording capacity with respect to the number of shingled magnetic recording band regions and the change in media cache capacity with respect to the number of shingled magnetic recording band regions.

FIG. 9 is a schematic diagram showing an example of the change in shingled magnetic recording capacity with respect to the number of shingled magnetic recording band regions SBA and the change in media cache capacity with respect to the number of shingled magnetic recording band regions.

FIG. 10 is a schematic diagram showing an example of the change in shingled magnetic recording capacity with respect to the number of shingled magnetic recording band regions and the change in media cache capacity with respect to the number of shingled magnetic recording band regions.

FIG. 13 is a schematic diagram showing examples of the state of the disk according to modified example 1.

FIG. 14 is a schematic diagram showing examples of testate of the disk according to modified example 1.

FIG. 16 is a schematic diagram showing examples of the state of the disk according to modified example 1.

FIG. 17 is a schematic diagram showing examples of the state of the disk according to modified example 1.

FIG. 18 is a schematic diagram showing examples of the state of the disk according to modified example 1.

FIG. 19 is a flowchart showing an example of the method of setting the recording region of the disk according to modified example 1.

FIG. 21 is a schematic diagram showing an example of the change in shingled magnetic recording capacity with respect to the number of shingled magnetic recording band regions and the change in media cache capacity with respect to the number of shingled magnetic recording band regions.

DETAILED DESCRIPTION

Figure 2:
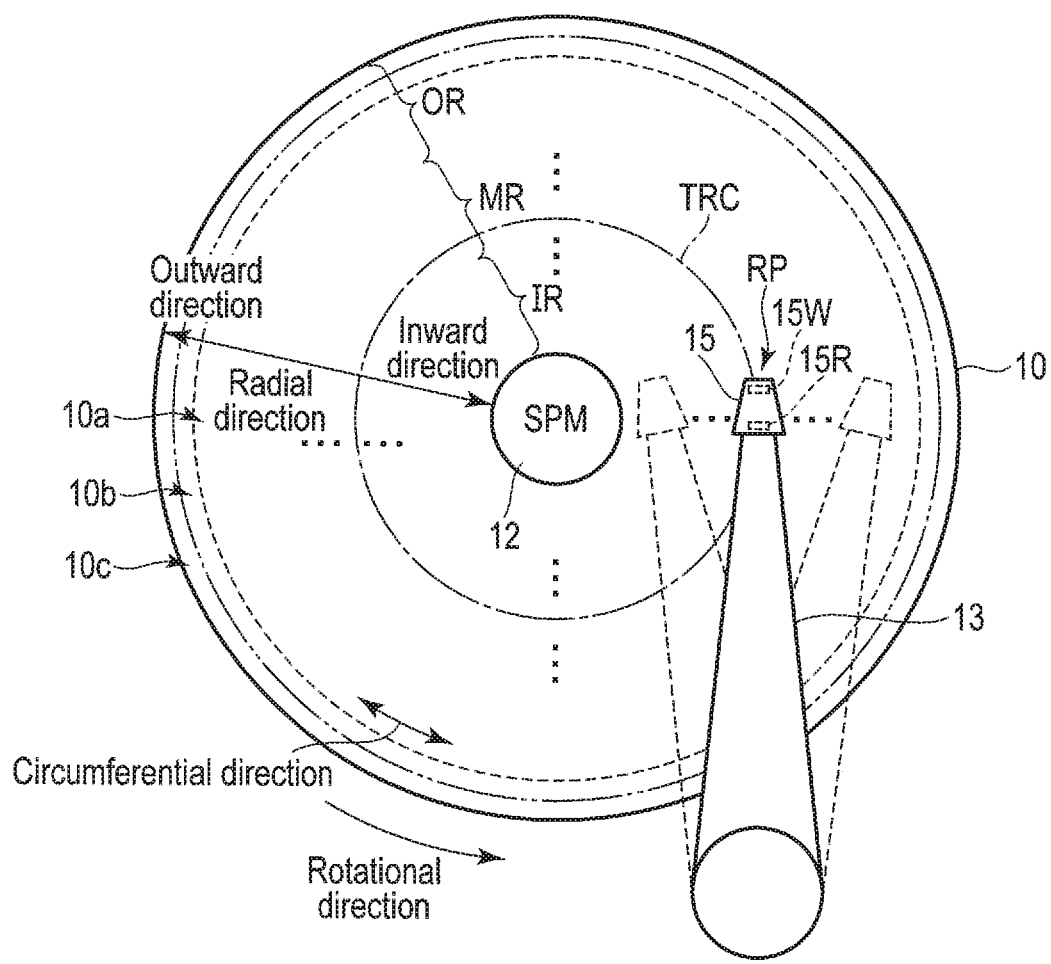
FIG. 2 is a schematic diagram showing an example of the layout of a head with respect to a disk according to the first embodiment.

In general, according to one embodiment, a magnetic disk device comprises a disk comprising a first region and a second region to which data before written to the first region is temporarily written; a head which writes data to the disk and reads data from the disk; and a controller which selectively performs conventional magnetic recording for writing a track at an interval in a radial direction of the disk and shingled magnetic recording for writing a track so as to overlap in the radial direction, and changes a cache data capacity of data which can be written to the second region in accordance with a first write capacity of data which can be written to the first region by the shingled magnetic recording.

Embodiments will be described hereinafter with reference to the accompanying drawings. Note that the drawings are merely examples and do not limit the scope of the invention.

(First Embodiment)

FIG. 1 is a block diagram showing the configuration of a magnetic disk device 1 according to a first embodiment.

The magnetic disk device 1 comprises a head disk assembly (HDA) to foe described later, a driver IC 20, a head amplifier integrated circuit (a head amplifier IC or a preamplifier) 30, a volatile memory 70, a nonvolatile memory 80, a buffer memory (buffer) 90, and a system controller 130 which is a single-chip integrated circuit. The magnetic disk device 1 is connected to a host system (hereinafter, simply referred to as a host) 100.

The HDA comprises a magnetic disk (disk) 10, a spindle motor (SPM) 12, an arm 13 on which a head 15 is mounted, and a voice coil motor (VCM) 14. The disk 10 is attached to the SPM 12 and is rotated by driving the SPM 12. The arm 13 and the VCM 14 constitute an actuator. The actuator performs movement control such that the head 15 mounted on the arm 13 is moved to a particular position of the disk 10 by driving the VCM 14. Two or more disks 10 and two or more heads 15 may be provided.

To the disk 10, a user data region 10a available for a user, a media cache (media cache region) 10b in which data (or a command) transferred from the host, etc., is temporarily stored before it is written to a particular region of the user data region 10a, and a system region 10c to which information necessary for system management is written are allocated in a region to which data can be written. Hereinafter, a direction from the inner circumference to the outer circumference of the disk 10 or a direction from the outer circumference to the inner circumference of the disk 10 is referred to as a radial direction. In a radial direction, a direction from the inner circumference to the outer circumference is referred to as an outward direction (external side), and a direction from the outer circumference to the inner circumference is referred to as an inward direction (internal side). A direction perpendicular to the radial direction of the disk 10 is referred to as a circumferential direction. A circumferential direction is equivalent to a direction along the circumference of the disk 10. In addition, a particular position of the disk 10 in a radial direction may be referred to as a radial position, and a particular position of the disk 10 in a circumferential direction may be referred to as a circumferential position. A radial position and a circumferential position may be collectively and simply referred to as a position. The disk 10 is divided into a plurality of regions (zones) for particular ranges in a radial direction, respectively. Each zone may be divided into a plurality of regions (band regions) for particular ranges in a radial direction, respectively. A plurality of tracks may be written to band regions. Each track includes a plurality of sectors. Each divisional region in the radial direction of the disk 10 may be referred to as a radial region. Each radial region includes a zone, a band region, a track, etc. The term "track" is used as one of a plurality of divisional regions in the radial direction of the disk 10, the path of the head 15 at a particular radial position, data extending in the circumferential direction of the disk 10, data for one track written to the track located at a particular radial position, data written to a track, and various other meanings. The term "sector" is used as one of a plurality of divisional regions in the circumferential direction of a track, data written to a particular position of the disk 10, data written to a sector, and various other meanings. A track written to the disk 10 may be referred to as a write track. A track read from the disk 10 may be referred to as a read track. A write track may be simply referred to as a track. A read track may be simply referred to as a track. A write track and a read track may be collectively referred to as a track. The width of a track in a radial direction may be referred to as a track width. The width of a write track in a radial direction may be referred to as a write track width. The width of a read track in a radial direction may be referred to as a read track width. A write track width and a read track width may be collectively and simply referred to as a track width. The path passing through the central position of the track width of a particular track is referred to as a track center. The path passing through the central position of the write track width of a particular write track may be referred to as a write track center. The path passing through the central position of the read track width of a read track may be referred to as a read track center. A write track center and a read track center may be collectively and simply referred to as a track center. The term "user data region" may be used to refer to a part of a user data region, one of a plurality of user data regions, some of a plurality of user data regions or all the user data regions of the disk 10. The term "media cache" may be used to refer to a part of a media cache, one of a plurality of media caches, some of a plurality of media caches or all the media caches of the disk 10.

The head 15 comprises a slider as a main body, and a write head 15W and a read head 15R mounted on the slider. The write head 15W writes data to the disk 10. The read head 15R reads data written to the disk 10. Note that the write head 15W may be simply referred to as the head 15, and the read head 15R may be simply referred to as the head 15, and the write head 15W and the read head 15R may be collectively referred to as the head 15. The central portion of the head 15 may be referred to as the head 15. The central portion of the write head 15W may be referred to as the write head 15W. The central portion of the read head 15R may be referred to as the read head 15R. The central portion of the write head 15 may be simply referred to as the head 15. The central portion of the read head 15R may be simply referred to as the head 15. The matter in which the position of the central portion of the head 15 is determined at the track center of a particular track may be expressed as "to determine the position of the head 15 in a particular track", "to provide the head 15 in a particular track" or "to position the head 15 in a particular track".

FIG. 2 is a schematic diagram showing an example of the layout of the head 15 with respect to the disk 10 according to the present embodiment. As shown in FIG. 2, the direction in which the disk 10 rotates in a circumferential direction is referred to as a rotational direction. In the example shown in FIG. 2, the rotational direction is counterclockwise. However, the rotational direction may be the opposite direction (clockwise). In FIG. 2, the disk 10 is divided into an inner circumferential region IR located on the internal side, an outer circumferential region CR located on the external side, and a middle circumferential region MR located between the inner circumferential region IR and the outer circumferential region CR. FIG. 2 shows the media cache 10b. In FIG. 2, the media cache 10b and the system region 10c are located in the outer circumferential region CR. In the example shown in FIG. 2, the system region 10c is located in the outermost circumference of the disk 10. The media cache 10b is provided so as to be adjacent to the system region 10c in an inward direction. The expression "adjacent" includes a structure in which, for example, data, objects, regions and spaces are provided so as to be in contact with each other as a matter of course, and also includes a structure in which they are arranged at particular intervals. The media cache 10b may be located in the inner circumferential region IR or the middle circumferential region HR. The media cache 10b may be located in the outer circumferential region CR, the middle circumferential region MR and the inner circumferential region IR in a dispersed manner. FIG. 2 shows a radial position RP. In the example shown in FIG. 2, the radial position PR is included in the middle circumferential region MR. FIG. 2 shows a track, center TRC. For example, the track center TRC is located concentrically with the disk 10. For example, the track center TRC is located in the shape of a perfect circle. The track center TRC may not be located in a circular shape. The track center TRC may be located in a wavelike fashion extending in a circumferential direction while changing in a radial direction. In FIG. 2, the radial position RP is equivalent to the track center TRC.

The position of the head 15 is determined at the radial position RP. The head 15 writes data to a particular track along the track center TRC by the write head 15W or reads data written to a particular track along the track center TRC by the read head 15R.

The driver IC 20 controls the driving of the SPM 12 and the VCM 14 under control of the system controller 130 (specifically, an MPU 60 to be explained later).

The head amplifier IC (preamplifier) 30 comprises a read amplifier, a write driver, etc. The read amplifier amplifies a read signal read from the disk 10 and outputs the amplified read signal to the system controller 130 (specifically, a read/write (R/W) channel 50 to be explained later). The write driver outputs, to the head 15, a write current corresponding to a signal output from the R/W channel 50.

The volatile memory 70 is a semiconductor memory in which the stored data is lost when power supply is cut off. The volatile memory 70 stores data necessary for processing in each unit of the magnetic disk device 1. The volatile memory 70 is, for example, a dynamic random access memory (DRAM) or a synchronous dynamic random access memory (SDRAM).

The nonvolatile memory 80 is a semiconductor memory which records stored data even when power supply is cut off. The nonvolatile memory 80 is, for example, a NOR type or NAND type flash read only memory (FROM).

The buffer memory 90 is a semiconductor memory which temporarily records data and the like transmitted and received between the magnetic disk device 1 and the host 100. The buffer memory 90 may be constituted integrally with the volatile memory 70. The buffer memory 90 is, for example, a DRAM, a static random access memory (SRAM), an SDRAM, a ferroelectric random access memory (FeRAM), or a magnetoresistive random access memory (MRAM).

The system controller (controller) 130 is realized by, for example, using a large scale integrated circuit (LSI) called a system-on-a-chip (SoC) in which a plurality of elements are integrated on a single chip. The system controller 130 includes a hard disk controller (HOC) 40, the read/write (R/W) channel 50 and the microprocessor or microprocessing unit (MPU) 60. The HDC 40, the R/W channel 50 and the MPU 60 are electrically connected to each other. The system controller 130 is electrically connected to, for example, the driver IC 20, the head amplifier IC 30, the volatile memory 70, the nonvolatile memory 80, the buffer memory 90 and the host system 100.

The HDC 40 controls data transfer between the host 100 and the R/W channel 50 in accordance with an instruction from the MPU 60 described later. The HDC 40 is electrically connected to, for example, the volatile memory 70, the nonvolatile memory 80 and the buffer memory 90.

The R/W channel 50 performs signal processing of read data and write data in accordance with an instruction from the MPU 60. The R/W channel 50 comprises a circuit or function for modulating write data. The R/W channel 50 comprises a circuit, or function for measuring the signal quality of read data. The R/W channel 50 is electrically connected to, for example, the head amplifier IC 30.

The MPU 60 is a main controller which controls each unit of the magnetic disk device 1. The MPU 60 controls the VCM 14 via the driver IC 20 and determines the position of the head 15. The MPU 60 controls the operation of writing data to the disk 10 and selects the storage destination of write data transferred from the host 100. The MUP 80 controls the operation of reading data from the disk 10 and controls the process of read data transferred from the disk 10 to the host 100. The MPU 60 manages the region in which data is recorded. The MPU 60 is connected to each unit of the magnetic disk device 1. The MPU 60 is electrically connected to, for example, the driver IC 20, the HDC 40 and the R/W channel 50.

The MPU 60 comprises a read/write controller 610 and a recording region management unit 620. The MPU 60 performs the processing of each unit, such as the read/write controller 610 and the recording region management unit 620, on firmware. The MPU 60 may comprise each unit, for example, the read/write controller 610 or the recording region management unit 620, as a circuit.

The read/write controller 610 controls the read process and write process of data in accordance with a command from the host 100, etc. The read/write controller 610 controls the VCM 14 via the driver IC 20, determines the position of the head 15 at a particular radial position on the disk 10 and performs a read process or a write process.

For example, the read/write controller 610 performs a write process by conventional magnetic recording (CMR), in which data is written to a track (adjacent track) adjacent to a particular track in a radial direction across an intervening particular interval (gap) in a radial direction. The term "adjacent track" includes a track adjacent to a particular track in an outward direction, a track adjacent to a particular track in an inward direction and a plurality of tracks adjacent to a particular track in an outward direction and an inward direction. The matter in which data is written by conventional magnetic recording may be expressed as "to record normally", "to perform a conventional magnetic recording process" or simply "to write". The read/write controller 610 performs a write process by shingled magnetic recording (SMR) or shingled write recording (SRW), in which the track (next track) to be written next is written to a part of a particular track (previous track) in a radial direction so as to overlap each other. Hereinafter, the matter in which data is written by shingled magnetic recording may be expressed as "to perform shingled magnetic recording" or "to perform a shingled magnetic recording process". The read/write controller 610 performs a conventional magnetic recording process or a shingled magnetic recording process in accordance with a command from the host 100, etc. In other words, the read/write controller 610 selectively performs a conventional magnetic recording process and a shingled magnetic recording process in accordance with a command from the host 100, etc. The read/write controller 610 may perform only a conventional magnetic recording process or perform only a shingled magnetic recording process. A write process which is not a shingled magnetic recording process may be referred to as a conventional magnetic recording process.

Figure 3:
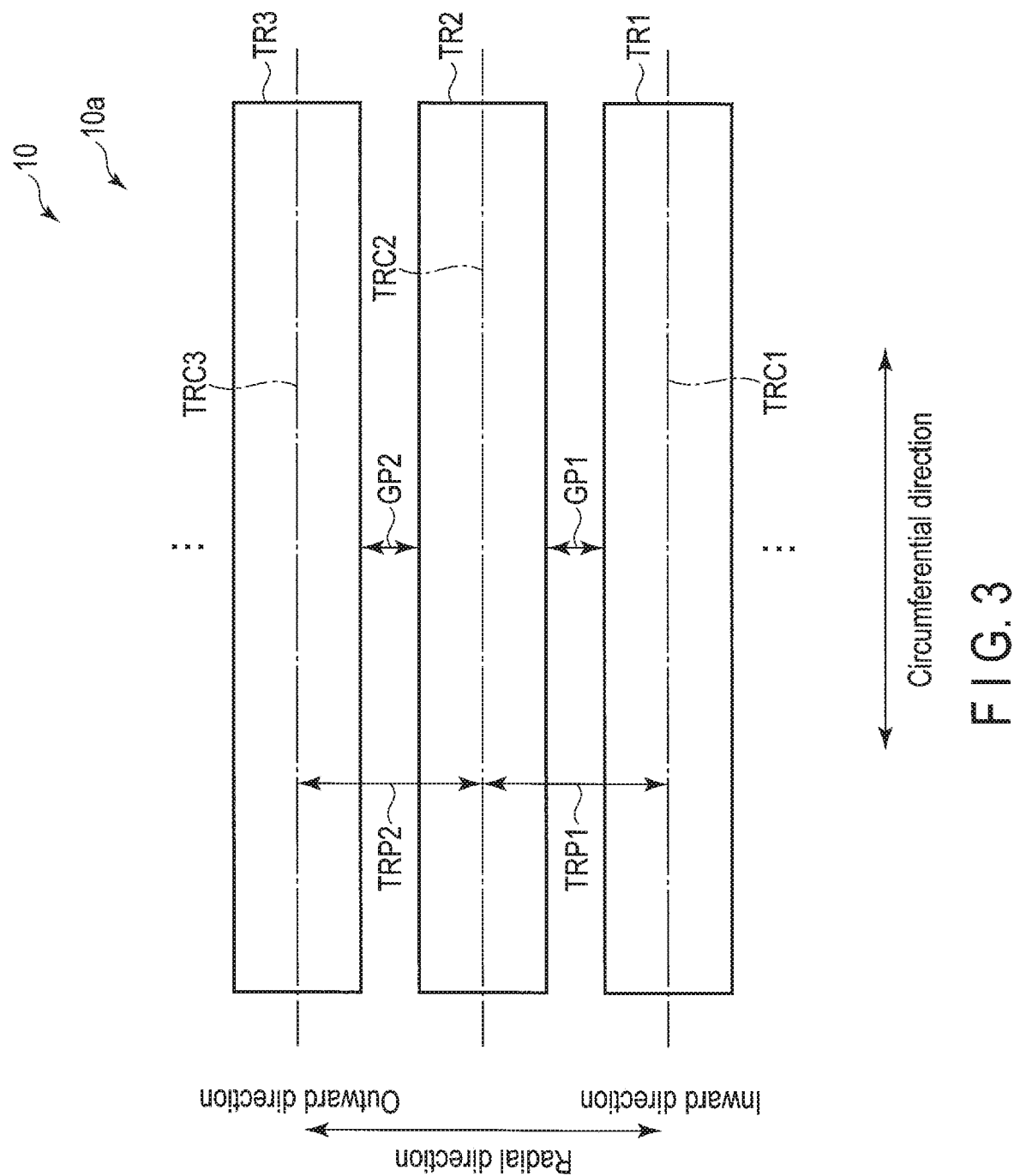
FIG. 3 is a schematic diagram showing an example of a conventional magnetic recording process.

FIG. 3 is a schematic diagram showing an example of a conventional magnetic recording process. FIG. 3 shows tracks TR1, TR2 and TR3. FIG. 3 shows track center TCR1 of track TR1, track center TRC2 of track TR2 and track center TRC3 of track TR3. In conventional magnetic recording, track pitch TRP1 of tracks TR1 and TR2 is equivalent to the distance between track center TRC1 and track center TRC2. Track pitch TRP2 of tracks TR2 and TR3 is equivalent to the distance between track center TRC2 and track center TRC3. Tracks TR1 and TR2 are spaced apart from each other with gap GP1. Tracks TR2 and TR3 are spaced apart from each other with gap GP2. In FIG. 3, for convenience sake, each track is shown in a rectangular shape extending in a circumferential direction with a particular track width. However, each track is curved in a circumferential direction in practice. Each track may have a wavelike shape extending in a circumferential direction while changing in a radial direction.

In the example shown in FIG. 3, in a particular region of the disk 10, for example, in the user data region 10a, the read/write controller 610 determines the position of the head 15 at track center TRC1, and normally records track TR1 or a particular sector of track TR1. In the user data region 10a, the read/write controller 610 determines the position of the head 15 at track center TRC2 spaced apart from track center TRC1 of track. TR1 with track pitch TRP1 in an outward direction, and normally records track TR2 or a particular sector of track TR2. In the user data region 10a, the read/write controller 610 determines the position of the head 15 at track center TRC3 spaced apart from track center TRC2 of track TR2 with track pitch TRP2 in an outward direction, and normally records track TR3 or a particular sector of track TR3. In a particular region of the disk 10, for example, in the user data region 10a, the read/write controller 610 may normally record tracks TR1, TR2 and TR3 in a sequential manner, or may normally record a particular sector of track TR1, a particular sector of track TR2 and a particular sector of track TR3 in a random manner.

Figure 4:
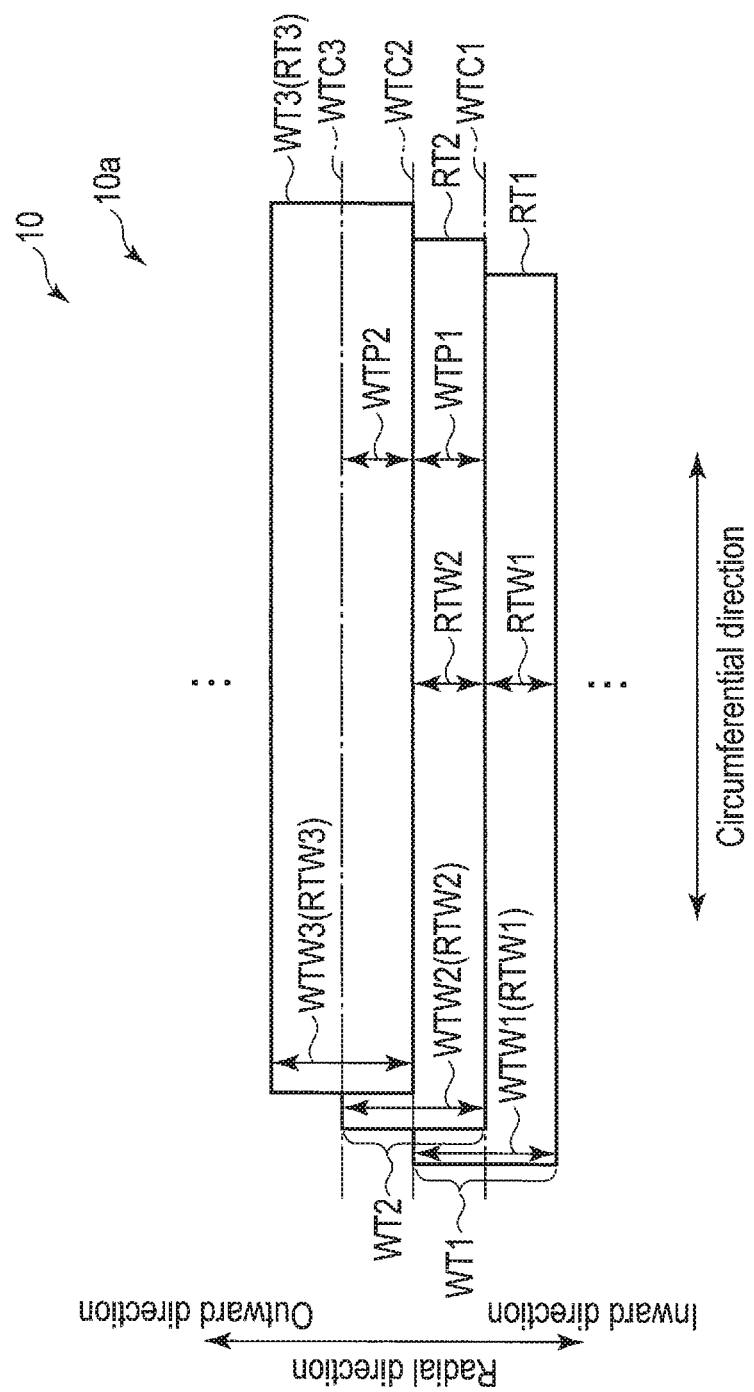
FIG. 4 is a schematic diagram showing an example of a shingled magnetic recording process.

FIG. 4 is a schematic diagram showing an example of a shingled magnetic recording process. FIG. 4 shows a plurality of tracks (track groups or bands) sequentially written so as to overlap each other in one direction of a radial direction. In shingled magnetic recording, a region to which data is written by the write head 15W is referred to as a write track. The remaining region other than the region to which a write track is written so as to overlap from a particular write track is referred to as a read track. In FIG. 4, for convenience sake, each track is shown in a rectangular shape extending in a circumferential direction with a particular track width. However, each track is curved in a circumferential direction in practice. Each track may have a wavelike shape extending in a circumferential direction while changing in a radial direction.

In FIG. 4, write track WT1 having write track width WTW1, write track WT2 having write track width WTW2 and write track WT3 having write track width WTW3 are sequentially written by shingled magnetic recording in an outward direction. In other words, write track WT1, write track WT2 and write track TW3 are written so as to overlap each other in an outward direction in this order. Write track WT2 is written so as to overlap write track WT1 in an outward direction. Track center WTC2 of write track WT2 is located at a position track pitch WTP1 distant from track center WTC1 of write track WT1 in an outward direction. Read track RT1 is equivalent to the remaining region in write track WT1 other than the region to which write track WT2 is written so as to overlap write track WT1. Read track width RTW1 of read track RT1 is equivalent to track pitch WTP1. Write track WT3 is written so as to overlap write track WT2 in an outward direction. Track center WTC3 of write track WT3 is located at a position track pitch WTP2 distant from track center WTC2 of write track WT2 in an outward direction. Read track RT2 is equivalent to the remaining region in write track WT2 other than the region to which write track WT3 is written so as to overlap write track WT2. Read track width RTW2 of read track RT2 is equivalent to track pitch WTP2. Read track RT3 is equivalent to write track WT3. Read track width RTW3 of read track RT3 is equivalent to write track width WTW3. In FIG. 4, three tracks are written so as to overlap each other. However, less than three tracks or more than three tracks may be written so as to overlap each other.

The recording region management unit. 620 manages the recording region of the disk 10 (simply, the disk 10) in accordance with an instruction from the host 100, etc. The recording region management unit 620 sets or changes the radial range (or area) of the user data region 10a and the radial range (or area) of the media cache 10b in the disk 10 in accordance with an instruction from the host 100, etc., for example, an instruction for the capacity of data (data capacity), the range of a particular region in a radial direction (radial range), the area of a particular region, the recording type and the radial range of the region to which data is written by a particular recording type. In other words, the recording region management unit 620 adjusts the ratios of the area of the user data region 10a and the area of the media cache 10b in the disk 10 in accordance with an instruction from the host 100, etc. The recording region management unit 620 sets or changes the capacity of data which can be written to the user data region 10a in the disk 10 (user data capacity) and the capacity of data which can be written to the media cache 10b in the disk 10 (media cache capacity) in accordance with an instruction from the host 100, etc. The term "radial range" includes, for example, the meanings of a region from, a particular radial position to another radial position, the distance from a particular radial position to another radial position, a region from a particular track to another track, the number of tracks arranged in a radial direction and a particular radial position. The radial range of a user data region or the area of a user data region may be simply referred to as a user data region. The radial range of a media cache or the area of a media cache may be simply referred to as a media cache. The user data capacity is equivalent to, for example, the upper limit of the capacity of data which can be written to a particular user data region 10a. The media cache capacity is equivalent, to, for example, the upper limit of the capacity of data which can be written to a particular media cache 10b. The term "the radial range of a user data region", "the area of a user data region" or "user data region" may be used to refer to the radial range or area of a part of user data region, the radial range or area of one of a plurality of user data regions, the sum of the radial ranges or areas of some of a plurality of user data regions, or the sum of the radial ranges or areas of all the user data regions of the disk 10. The term "user data capacity" may be used to refer to the upper limit of the capacity of data which can be written to one of a plurality of user data regions, the upper limit of the capacity of data which can be written to some of a plurality of user data regions, or the upper limit of the capacity of data which can be written to all the user data regions of the disk 10. The term "the area of a media cache" or "media cache" may be used to refer to the area of a part of a media cache, the area of one of a plurality of media caches, the sum of the areas of some of a plurality of media caches, the sum of the areas of all the media caches of the disk 10, a track included in a media cache, some tracks included in a media cache, or the number of tracks included in a media cache. The term "media cache capacity" may be used to refer to the upper limit, of the capacity of data which can be written to one of a plurality of media caches, the upper limit of the capacity of data which can be written to some of a plurality of media caches, or the upper limit of the capacity of data which can be written to all the media caches of the disk 10. The recording region management unit 620 may hold the division of the user data region 10a, the media cache 10b and the system region 10c in the disk 10 as a table in a particular recording region, for example, the system region 10c of the disk 10 or the nonvolatile memory 80. For example, the recording region management unit 620 sets the user data region 10a, the media cache region 10b and the system region 10c in the disk 10 by rewriting the values of the user data region 10a, the media cache region 10b and the system region 10c recorded in the table.

The recording region management unit 620 sets or changes a particular recording region of the disk 20 so as to be or to the user data region 10a (conventional magnetic recording region) to which data is written by conventional magnetic recording in accordance with an instruction from the host 100, etc. In other words, the recording region management unit 620 sets or changes the radial range (or area) of the conventional magnetic recording region in the disk 10 in accordance with an instruction from the host 100, etc. The recording region management unit 620 sets or changes the capacity of data which can be written by conventional magnetic recording in the disk 10 (in other words, the capacity of the conventional magnetic recording region or conventional magnetic recording capacity) in accordance with an instruction from the host 100, etc. The conventional magnetic recording capacity is equivalent to, for example, the upper limit of the capacity of data which can be written to the disk 10 by conventional magnetic recording. The term "conventional magnetic recording capacity" may be used to refer to the upper limit of the capacity of data which can be written to one of a plurality of conventional magnetic recording regions, the upper limit of the capacity of data which can be written to some of a plurality of conventional magnetic recording regions, or the upper limit of the capacity of data which can he written to all the conventional magnetic recording regions of the disk 10. For example, the recording region management unit 620 changes a particular region of the shingled magnetic recording region of the user data region 10a to a conventional magnetic recording region in accordance with an instruction from the host 100. For example, the recording region management unit 620 changes a particular region of the shingled magnetic recording region of the user data region 10a to a conventional magnetic recording region in accordance with an instruction from the host 100, etc., increases the area of the conventional magnetic recording region in the disk 10 and decreases the area of the shingled magnetic recording region in the disk 10. The radial range of a conventional magnetic recording region or the area of a conventional magnetic recording region may be simply referred to as a conventional magnetic recording region. The radial range of a shingled magnetic recording region or the area of a shingled magnetic recording region may be simply referred to as a shingled magnetic recording region. The term "conventional magnetic recording region" may be used to refer to a part of a conventional magnetic recording region, one of a plurality of conventional magnetic recording regions, some of a plurality of conventional magnetic recording regions or all the conventional magnetic recording regions of the disk 10. The terms "the radial range of a conventional magnetic recording region", "the area of a conventional magnetic recording region" and "conventional magnetic recording region" may be used to refer to the radial range or area of a part of a conventional magnetic recording region, the radial range or area of one of a plurality of conventional magnetic recording regions, the sum of the radial ranges or areas of some of a plurality of conventional magnetic recording regions or the sum of the radial ranges or areas of all the conventional magnetic recording regions of the disk 10. The term "shingled magnetic recording region" may be used to refer to a part, of a shingled magnetic recording region, one of a plurality of shingled magnetic recording regions, some of a plurality of shingled magnetic recording regions or all the shingled magnetic recording regions of the disk 10. The terms "the radial range of a shingled magnetic recording region", "the area of a shingled magnetic recording region" and "shingled magnetic recording region" may be used to refer to the radial range or area of a part of a shingled magnetic recording region, the radial range or area of one of a plurality of shingled magnetic recording regions, the sum of the radial ranges or areas of some of a plurality of shingled magnetic recording regions, or the sum of the radial ranges or areas of all the shingled magnetic recording regions of the disk 10. For example, the recording region management unit 620 changes a particular region of the media cache 10b to a conventional magnetic recording region in accordance with an instruction from the host 100, etc. For example, the recording region management unit 620 changes a particular region of the media cache 10b to a conventional magnetic recording region in accordance with an instruction from the host 100, etc., increases the area of the conventional magnetic recording region in the disk 10, and decreases the media cache 10b in the disk 10. For example, the recording region management unit 602 manages a conventional, magnetic recording region for each region having a specific area (or specific radial range) or each region to which data can be written up to a specific data capacity (in other words, a conventional magnetic recording band region). A conventional magnetic recording band region may include a plurality of tracks written by conventional magnetic recording. For example, the recording region management unit 620 sets a conventional magnetic recording region for each conventional magnetic recording band region in the disk 10. For example, the recording region management unit 620 changes a conventional magnetic recording region to a shingled magnetic recording region for each conventional magnetic recording band region. The recording region management unit 620 may not set a conventional magnetic recording region for each conventional magnetic recording band region, and may set the region of an arbitrary radial range (or area) of the disk 10 so as to be a conventional magnetic recording region in accordance with an instruction from the host 100, etc. The recording region management unit 620 sets or changes a particular recording region of the disk 10 so as to be or to the user data region 10a (in other words, a shingled magnetic recording region) to which data is written by shingled magnetic recording in accordance with an instruction from the host 100, etc. In other words, the recording region management unit 620 sets or changes the radial range (or area) of the shingled magnetic recording region in the disk 10 in accordance with an instruction from the host 100, etc. The recording region management unit 620 sets or changes the capacity of data which can be written by shingled magnetic recording in the disk 10 (in other words, the capacity of the shingled magnetic recording region or shingled magnetic recording capacity) in accordance with an instruction from the host 100, etc. The shingled magnetic recording capacity is equivalent to, for example, the upper limit of the capacity of data which can be written by shingled magnetic recording. The term "shingled magnetic recording capacity" may be used to refer to the upper limit of the capacity of data which can be written to one of a plurality of shingled magnetic recording regions, the upper limit of the capacity of data which can be written to some of a plurality of shingled magnetic recording regions, or the upper limit of the capacity of data which can be written to all the shingled magnetic recording regions of the disk 10. For example, the recording region management unit 620 changes a particular, region of the conventional magnetic recording region of the user data region 10*a* to a shingled magnetic recording region in accordance with an instruction from the host 100, etc. For example, the recording region management unit 620 changes a particular region of the conventional magnetic recording region of the user data region 10*a* to a shingled magnetic recording region in accordance with an instruction from the host 100, etc., increases the shingled magnetic recording region in the disk 10 and decreases the conventional magnetic recording region in the disk 10. Thus, the recording region management unit 620 adjusts the ratios of the conventional magnetic recording region and the shingled magnetic recording region of the user data region 10*a* in accordance with an instruction from the host 100, etc. For example, the recording region management unit 620 changes a particular region of the media cache 10*b* to a shingled magnetic recording region in accordance with an instruction from the host 100, etc. In other words, the recording region management unit 620 changes a particular region of the media cache 10*b* to a shingled magnetic recording region in accordance with an instruction from the host 100, etc., increases the shingled magnetic recording region in the disk 10, and decreases the media cache 10*b* in the disk 10, For example, the recording region management unit 620 manages a shingled magnetic recording region for each region having a specific area (or specific radial range) or each region to which data can be written up to a specific data capacity (in other words, a shingled magnetic recording band region). A shingled magnetic recording band region may include a plurality of tracks written by shingled magnetic recording. For example, the recording region management unit 20 sets a shingled magnetic recording region for each shingled magnetic recording band region in the disk 10. For example, the recording region management unit 620 changes a shingled magnetic recording region to a conventional magnetic recording region for each shingled magnetic recording band region. The recording region management unit 620 may not set a shingled magnetic recording region for each shingled magnetic recording band region, and may set the region of an arbitrary radial range (or area) of the disk 10 to a shingled magnetic recording region in accordance with an instruction from the host 100, etc. The recording region management unit 620 may hold the division of the conventional magnetic recording region and the shingled magnetic recording region in the user data region 10*a* as a table in a particular recording region, for example, the system region 10*c* of the disk 10 or the nonvolatile memory 80. For example, the recording region management unit 620 sets a conventional magnetic recording region and a shingled magnetic recording region in the user data region 10*a* by rewriting the values of the conventional magnetic recording region and the shingled magnetic recording region recorded in the table.

The radial range of a conventional magnetic recording band region (in other words, a conventional magnetic recording band range) is different from the radial range of a shingled magnetic recording band region (in other words, a shingled magnetic recording band range). In other words, the area of a conventional magnetic recording band region is different from the area of a shingled magnetic recording band region. Hereinafter, a conventional magnetic recording band range or the area of a conventional magnetic recording band region may be simply referred to as a conventional magnetic recording band region. A shingled magnetic recording band range or the area of a shingled magnetic recording band region may he simply referred to as a shingled magnetic recording band region. For example, a conventional magnetic recording band range is larger than a shingled magnetic recording band range. In other words, a conventional magnetic recording band region is larger than a shingled magnetic recording band region. A conventional magnetic recording band range may be the same as a shingled magnetic recording band range. In other words, a conventional magnetic recording band region may be the same as a shingled magnetic recording band region. The expressions "same", "match", etc., indicate that they are completely the same as each other, and they are completely matched with each other as a matter of course, and also indicate that they deviate from each other to the extent that they are considered to be substantially the same as each other and they deviate from each other to the extent that they are considered to be substantially matched with each other. A conventional magnetic recording band range may be smaller than a shingled magnetic recording band range. For example, the capacity of data which can be written to one conventional magnetic recording band region (in other words, conventional magnetic recording band capacity) is equal to the capacity of data which can be written to one shingled magnetic recording band region (in other words, shingled magnetic recording band capacity). The conventional, magnetic recording band capacity is equivalent to, for example, the upper limit of the capacity of data which can be written to one conventional magnetic recording band region. The shingled magnetic recording data capacity is equivalent to, for example, the upper limit of the capacity of data which can be written to one shingled magnetic recording band region. The conventional magnetic recording band capacity may be different from the shingled magnetic recording band capacity. The term "conventional magnetic recording band region" may be used to refer to a part of a conventional magnetic recording band region, one of a plurality of conventional magnetic recording band regions, some of a plurality of conventional, magnetic recording band regions or all the conventional magnetic recording band regions of the disk 10. The terms "the radial range of a conventional magnetic recording band region", "the area of a conventional magnetic recording band region" and "conventional magnetic recording band region" may be used to refer to the radial range or area of a part of a conventional magnetic recording band region, the radial range or area of one of a plurality of conventional magnetic recording band regions, the sum of the radial ranges or areas of some of a plurality of conventional magnetic recording band regions or the sum of the radial ranges or areas of all the conventional magnetic recording band regions of the disk 10. The term "conventional magnetic recording band capacity" may be used to refer to the upper limit of the capacity of data which can be written to one of a plurality of conventional magnetic recording band regions, the upper limit of the capacity of data which can be written to some of a plurality of conventional magnetic recording band regions, or the upper limit of the capacity of data which can be written to all the conventional magnetic recording band regions of the disk 10. The term "shingled magnetic recording band region" may be used to refer to a part of a shingled magnetic recording band region, one of a plurality of shingled magnetic recording band regions, some of a plurality of shingled magnetic recording band regions or all the shingled magnetic recording band regions of the disk 10. The terms "the radial range of a shingled magnetic recording band region", "the area of a shingled magnetic recording band region" and "shingled magnetic recording band region" may be used to refer to the radial range or area of a part of a shingled magnetic recording band region, the radial range or area of one of a plurality of shingled magnetic recording band regions, the sum of the radial ranges or areas of some of a plurality of shingled magnetic recording band regions, or the sum of the radial ranges or areas of all the shingled magnetic recording band regions of the disk 10. The term "shingled magnetic recording band capacity" may be used to refer to the upper limit of the capacity of data which can be written to one of a plurality of shingled magnetic recording band regions, the upper limit of the capacity of data which can be written to some of a plurality of shingled magnetic recording band regions, or the upper limit of the capacity of data which can be written to all the shingled magnetic; recording band regions of the disk 10.

The recording region management unit 620 sets or changes the media cache 10b (or media cache capacity) in accordance with the shingled magnetic recording capacity (the area of the shingled magnetic recording region or the radial range of the shingled magnetic recording region). In other words, the recording region management unit 620 sets or changes the media cache capacity in accordance with the shingled magnetic recording capacity (the area of the shingled magnetic recording region or the radial range of the shingled magnetic recording region). For example, the recording region management unit 620 increase the media cache 10b (or media cache capacity) when the shingled magnetic recording capacity is increased. The recording region management unit 620 decreases the media cache 10b (the radial range of the media cache 10b or the media cache capacity) when the shingled magnetic recording capacity is decreased. For example, when the user data region 10a of the disk 10 is entirely a conventional magnetic recording region, the media cache capacity is several megabytes to several hundreds of megabytes, for example, 256 megabytes (MB). For example, when the user data region 10a of the disk 10 is entirely a shingled magnetic recording region, the media cache capacity is several gigabytes to several tens of gigabytes, for example, 16 gigabytes (GB). The recording region management unit 620 may set or change the media cache 10b (or media cache capacity) in accordance with the conventional magnetic recording capacity (the area of the conventional magnetic recording region or the radial range of the conventional magnetic recording region). The recording region management unit 620 may not set or change the media cache 10b (or media cache capacity) in accordance with the shingled magnetic recording capacity (the area of the shingled magnetic recording region or the radial range of the shingled magnetic recording region).

FIG. 5 is a schematic diagram showing examples of a conventional magnetic recording region CR and a shingled magnetic recording region SR.

The recording region management unit 620 sets a conventional magnetic recording region CR and a shingled magnetic recording region SR in the user data region 10a. The conventional magnetic recording region. CR includes at least one band region BA (conventional magnetic recording band region CBA). In the example shown in FIG. 5, the conventional magnetic recording region CR includes two conventional magnetic recording band regions CBA. The shingled magnetic recording region SR includes at least one band region BA (shingled magnetic recording band region SBA). In the example shown in FIG. 5, the shingled magnetic recording region SR includes two shingled magnetic recording regions SBA. The conventional magnetic recording band capacity of a conventional magnetic recording band region CBA is equal to the shingled magnetic recording band capacity of a shingled magnetic recording band region SBA. Conventional magnetic recording band range BW1 is larger than shingled magnetic recording band range BW2. The capacity of data which can be written to one band region BA (in other, words, a band capacity) is several megabytes to several gigabytes, for example, 256 MB. In other words, the conventional magnetic recording band capacity and the shingled magnetic recording band capacity are several megabytes to several gigabytes, for example, 256 MB.

Figure 6:
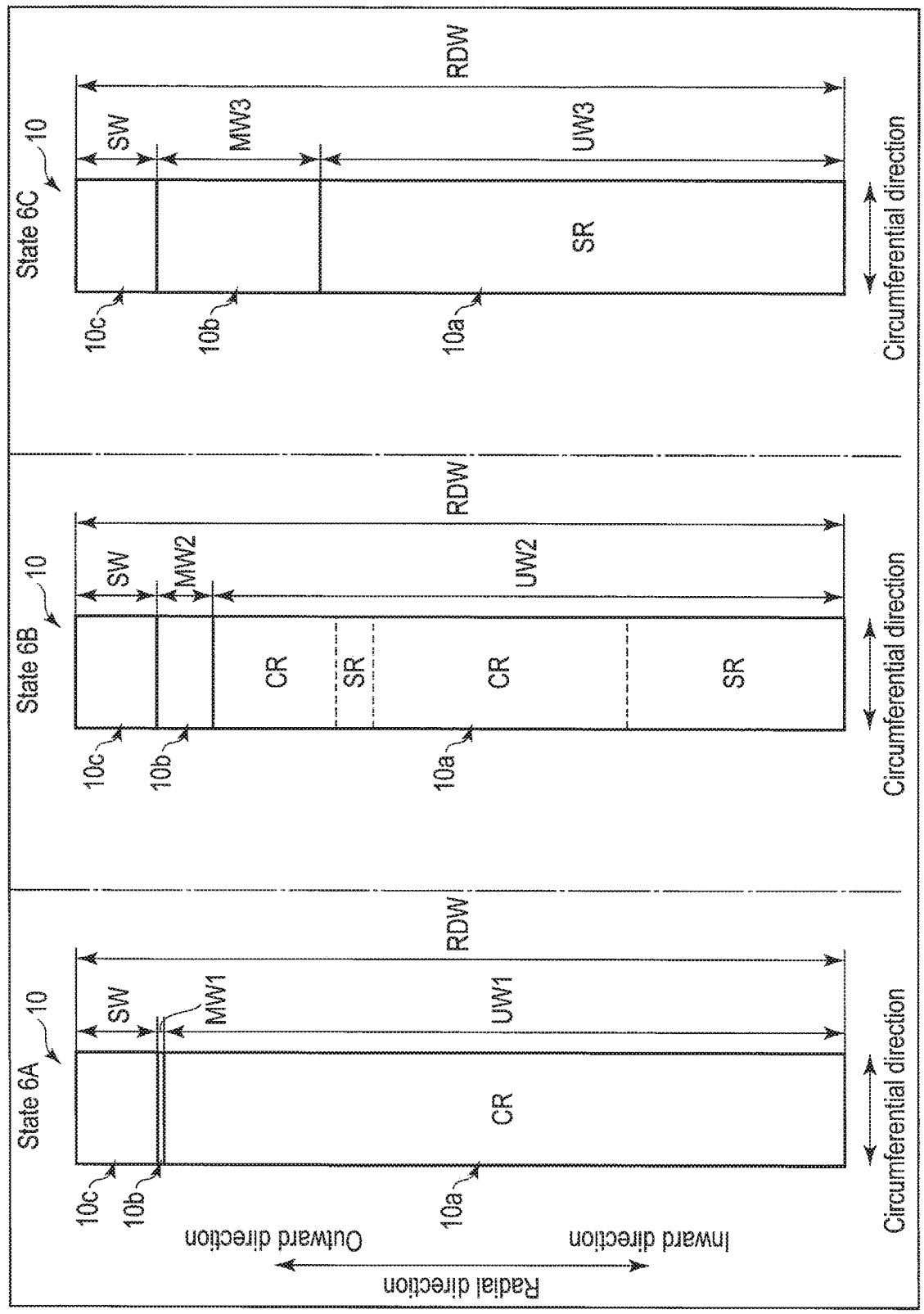
FIG. 6 is a schematic diagram showing examples of the state of the disk according to the first embodiment.

FIG. 6 is a schematic diagram showing examples of the state of the disk 10 according to the present embodiment. FIG. 6 shows state 6A of the disk 10, state 6B of the disk 10 and state 6C of the disk 10. In state 6A to state 6C, the region of a part of the disk 10 is shown. In state 6A to state 60, for convenience sake, the region of a part of the disk 10 is shown, in a rectangular shape extending in a radial direction. However, as shown in FIG. 1 and FIG. 2, the region is curved in a circumferential direction in practice. State 6A shows the state of the disk 10 in which the user data region 10a is entirely set so as to be a conventional magnetic recording region CR. For example, the shingled magnetic recording capacity in state 6A is 0 bytes. In state 6A, radial range RDW from the innermost circumference to the outermost circumference of the disk 10 (simply, the radial range of the disk 10 or the radius of the disk 10), radial range UW1 of the user data region 10a, radial range MW1 of the media cache 10b and radial range SW of the system region 10c; are shown. Radial range UW1 of the user data region 10a is larger than radial range MW1 of the media cache 10b. State 6B shows the state .of the disk 10 in which conventional magnetic recording regions CR and shingled magnetic recording regions SR are mixed in the user data region 10a. The shingled magnetic recording capacity of state 6B is greater than that of state 6A. In state 6B, radial range RDW of the disk 10, radial range UW2 of the user data region 10a, radial range MW2 of the media cache 10b and radial range SW of the system region 10c are shown. Radial range UW2 of the user data region 10a is larger than radial range MW2 of the media cache 10b. Radial range UW2 of the user data region 10a in state 6B is smaller than radial range UW1 of the user data region 10a in state 6A. Radial range M2 of the media cache 10b in state 6B is larger than radial range MW1 of the media cache 10b in state 6A. Thus, the media cache capacity of state 6B is greater than that of state 6A. State 6C shows the state of the disk 10 in which the user data region 10a is entirely set so as to be a shingled magnetic recording region SR. The shingled magnetic recording capacity of state 6C is greater than that of state 6B. In state 6C, radial range RDW of the disk 10, radial range UW3 of the user data region 10a, radial range MW3 of the media cache 10b and radial range SW of the system region 10c are shown. Radial range UW3 of the user data region 10a is larger than radial range MW3 of the media cache 10b. Radial range UW3 of the user data region 10a in state 6C is smaller than radial range UW2 of the user data region 10a in state 6B. Radial range MW3 of the media cache 10b in state 6C is larger than radial range MW2 of the media cache 10b in state 6B. Thus, the media cache capacity of state 6C is greater than that of state 6B.

The recording region management unit 620 sets the media cache 10b in accordance with an instruction from the host 100, etc. In the example shown in FIG. 6, when an instruction for setting to a shingled magnetic recording capacity (=0) corresponding to the entire radial range (or area) of the shingled magnetic recording region SR in state 6A is received from the host 100, etc., the recording region management unit 620 performs setting to radial range MW1 of the media cache 10b. The recording region management unit 620 sets the region of the disk 10 excluding the system region 10c and the media cache 10b so as to be the user data region 10a. In the example shown in FIG. 6, the recording region management unit 620 sets the remaining radial range UW1 of radial range RDW of the disk 10 excluding radial range SW of the system region 10c and radial range MW1 of the media cache 10b so as to be the user data region 10a. The recording region management unit 620 sets the entire region of the user data region 10a so as to be a conventional magnetic recording region CR in accordance with a shingled magnetic recording capacity corresponding to the entire radial range (or area) of the shingled magnetic recording region SR of state 6A as instructed from the host 100, etc.

When an instruction for changing a shingled magnetic recording capacity corresponding to the radial range (or area) of the shingled magnetic recording region SR in state 6A to a shingled magnetic recording capacity corresponding to the sum of the radial ranges (or areas) of a plurality of shingled magnetic recording regions SR in state 6B is received from the host 100, etc., the recording region management unit 620 changes the media cache 10b in state 6A to the media cache 10b in state 63. In the example shown in FIG. 6, when an instruction for changing a shingled magnetic recording capacity corresponding to the radial range (or area) of the shingled magnetic recording region SR in state 6A to a shingled magnetic recording capacity corresponding to the sum of the radial ranges (or areas) of a plurality of shingled magnetic recording regions SR in state 6B is received from the host 100, etc., the recording region management unit 620 changes radial range MW1 of the media cache 10b to radial range MW2 of the media cache 10b. The recording region management unit 620 sets the region of the disk 10 excluding the system region 10c and the media cache 10b so as to be the user data region 10a. In the example shown in FIG. 6, the recording region management unit 620 sets the remaining radial range UW2 of radial range RDW of the disk 10 excluding radial range SW of the system region 10c and radial range MW2 of the media cache 10b so as to be the user data region 10a. The recording region management unit 620 changes a particular conventional magnetic recording region CR of the user data region 10a to a shingled magnetic recording region SR in accordance with a shingled magnetic recording capacity corresponding to the sum of the radial ranges (or areas) of the shingled magnetic recording regions SR in state 6B as instructed from the host 100, etc.

When an instruction for changing a shingled magnetic recording capacity corresponding to the sum of the radial ranges for areas) of the shingled magnetic recording regions SR in state 6B to a shingled magnetic recording capacity corresponding to the radial range (or area) of the shingled magnetic recording region SR in sate 6C is received from the host 100, etc., the recording region management unit 620 changes the media cache 10b in state 6B to the media cache 10b in state SC. In the example shown in FIG. 6, when an instruction for changing a shingled magnetic recording capacity corresponding to the sum of the radial ranges for areas) of the shingled magnetic recording regions SR in state 6B to a shingled magnetic recording capacity corresponding to the radial range (or area) of the shingled magnetic recording region SR in sate SC is received from the host 100, etc., the recording region management unit 620 changes radial range MW2 of the media cache 10b to radial range MW3 of the media cache 10b. The recording region management unit 620 sets the region of the disk 10 excluding the system region 10c and the media cache 10b so as to be the user data region 10a. In the example shown in FIG. 6, the recording region management unit 620 sets the remaining radial range UW3 of radial range RDW of the disk 10 excluding radial range SW of the system region 10c and radial range MW3 of the media cache 10b so as to be the user data region 10a. The recording region management unit 620 changes all the conventional magnetic recording regions CR of the user data region 10a to a shingled magnetic recording region SR in accordance with a shingled magnetic recording capacity corresponding to the radial range (or area) of the shingled magnetic recording region SR in state 6C as instructed from the host 100, etc.

In FIG. 6, this specification explains a case where state 6A is changed to state 6B and state 6B is changed to state 6C. However, state 6A may be changed to state 6C, or state 6B may be changed to state 6A, or state 6C may be changed to state 6A or state 6B. The conventional magnetic recording region CR may be changed to a shingled magnetic recording region SR while the media cache capacity of state 6A (the area of the media cache 10b or the radial range of the media cache 10b) is fixed. The conventional magnetic recording regions CR may be changed to shingled magnetic recording regions SR or the shingled magnetic recording regions SR may be changed to conventional magnetic recording regions CR while the media cache capacity of state 6B (the area of the media cache 10b or the radial range of the media cache 10b) is fixed. The shingled magnetic recording region SR may be changed to a conventional magnetic recording region CR while the media cache capacity of state 6C (the area of the media cache 10b or the radial range of the media cache 10b) is fixed.

Now, this specification explains examples of a method of setting media cache capacity in accordance with shingled magnetic recording capacity or the number of shingled magnetic recording band regions with reference to FIG. 7, FIG. 8, FIG. 9, FIG. 10 and FIG. 11.

FIG. 7 is a schematic diagram showing an example of change SCL in shingled magnetic recording capacity with respect to the number of shingled magnetic recording band regions SBA and change MCL1 in media cache capacity with respect to the number of shingled magnetic recording band regions SBA. In FIG. 7, the vertical axis shows shingled magnetic recording capacity and media cache capacity, and the horizontal axis shows the number of shingled magnetic recording band regions SBA. The number of shingled magnetic recording band regions SBA is equivalent to, for example, the area of the shingled magnetic recording region SR or the radial range of the shingled magnetic recording region SR. In FIG. 7, the shingled magnetic recording capacity and the media cache capacity are increased toward the distal end side of the arrow of the vertical axis. In the vertical axis of FIG. 7, a capacity (defined capacity) MAC which can hold the data (or command) having a specific capacity (or number) transmitted from the host 100, etc., is shown. The defined capacity is equivalent to, for example, a media cache capacity sufficient to perform a write process of a refresh process for rewriting data when the entire user data region 10a is set so as to be a shingled magnetic recording region SR. The defined capacity is set based on the number of write commands which are permitted when the entire user data region 10a is set so as to be a shingled magnetic recording region SR, the frequency of refresh write which is assumed when the entire user data region 10a is set so as to be a shingled magnetic recording region SR, and the degree of degradation of write performance which is permitted when the entire user data region 10a is set so as to be a shingled magnetic recording region SR. For the defined capacity, the same value may be set in all the magnetic disk, devices, or different values may be set in different disk devices, respectively. The defined capacity is equivalent to, for example, a capacity which can store several commands to several hundreds of commands transmitted from the host 100, etc. For example, the defined capacity is equivalent to a capacity which allows 100 commands transmitted from the host 100, etc. The defined capacity is a dozen or so gigabytes to several tens of gigabytes, for example, 16 GB when the band capacity is 256 MB. In FIG. 7, the number of shingled magnetic recording band regions SBA is increased toward the distal end side of the arrow of the horizontal axis. The horizontal axis of FIG. 7 indicates the number SV of shingled magnetic recording band regions (in other words, a defined number) in which the shingled magnetic recording capacity reaches the defined capacity MAC. The defined number SV is a few to several tens, for example, 62 or 63 when the band capacity is 256 MB and the defined capacity is 16 GB. FIG. 7 shows change MCL1 in media cache capacity with respect to the number of shingled magnetic recording band regions SBA (in other words, the change in media cache capacity) and change SCL in shingled magnetic recording capacity with respect to the number of shingled magnetic recording band regions SBA (in other words, the change in shingled magnetic recording capacity). In the example shown in FIG. 7, change MCL1 in media cache capacity is constant. Change SCL in shingled magnetic recording capacity is linearly proportional to the number of shingled magnetic recording band regions SBA. For example, change MCL1 in media cache capacity and change SCL in shingled magnetic recording capacity in FIG. 7 show the state in which the user data region 10a is changed from a conventional magnetic recording region CR to a shingled magnetic recording region SR or the user data region 10a is changed from a shingled magnetic recording region SR to a conventional magnetic recording region CR while the media cache 10b is made constant in state 6C of FIG. 6.

The recording region management unit 620 does not change the media cache capacity in accordance with the shingled magnetic recording capacity. In other words, the recording region management unit 620 does not change the media cache capacity in accordance with the number of shingled magnetic recording band regions. In the example shown in FIG. 7, the recording region management unit 620 maintains the media cache capacity so as to be constant in accordance with change MCL1 in the media cache capacity when the shingled magnetic recording capacity is increased in accordance with change SCL in the shingled magnetic recording capacity. In other words, the recording region management unit 620 maintains the area of the media cache 10b (or the radial range of the media cache 10b) so as to be constant in accordance with change MCL1 in the media cache capacity when the number of shingled magnetic recording band regions SBA (the area of the shingled magnetic recording region SR or the radial range of the shingled magnetic recording region SR) is increased in accordance with change SCL in the shingled magnetic recording capacity. For example, the recording region management unit 620 increases the number of shingled magnetic recording band regions SBA (the area of the shingled magnetic recording region SR or the radial range of the shingled magnetic recording region SR) in accordance with change SCL in the shingled magnetic recording capacity, decreases the number of conventional magnetic recording band regions CBA in the disk 10, maintains the area of the media cache 10b (or the radial range of the media cache 10b) so as to be constant in accordance with change MCL1 in the media cache capacity and maintains the area of the user data region 10a (or the radial range of the user data region 10a) so as to be constant. The number of conventional magnetic recording band regions CBA is equivalent to, for example, the area of conventional magnetic recording regions CR or the radial range of the conventional magnetic recording region CR.

In the example shown in FIG. 7, the recording region management unit 620 maintains the media cache capacity so as to be constant in accordance with change MCL1 in the media cache capacity when the shingled magnetic recording capacity is decreased in accordance with change SCL in the shingled magnetic recording capacity. In other words, the recording region management unit 620 maintains the area of the media cache 10b (or the radial range of the media cache 10b) so as to be constant in accordance with change MCL1 in the media cache capacity when the number of shingled magnetic recording band regions SBA is decreased in accordance with change SCL in the shingled magnetic recording capacity. For example, the recording region management unit 620 decreases the number of shingled magnetic recording band regions SBA in accordance with change SCL in the shingled magnetic recording capacity, increases the number of conventional magnetic recording band regions CBA in the disk 20, maintains the area of the media cache 10b (or the radial range of the media cache 10b) so as to be constant in accordance with change MCL1 in the media cache capacity and maintains the area of the user data region 10a (or the radial range of the user data region 10a) so as to be constant.

FIG. 8 is a schematic diagram showing an example of change SCL in shingled magnetic recording capacity with respect to the number of shingled magnetic recording band regions SBA and change MCL2 in media cache capacity with respect to the number of shingled magnetic recording band regions SBA. In FIG. 8, the vertical axis shows shingled magnetic recording capacity and media cache capacity, and the horizontal axis shows the number of shingled magnetic recording band regions SBA. In FIG. 8, the shingled magnetic recording capacity and the media cache capacity are increased toward the distal end side of the arrow of the vertical axis. In the vertical axis of FIG. 8, the defined capacity MAC and a minimum media cache capacity (in other words, minimum capacity) MIC are shown. The minimum capacity MIC is equivalent to a media cache capacity when the user data region 10a is entirely set so as to be a conventional magnetic recording region CR. For example, the minimum capacity MIC is several megabytes to several hundreds of megabytes, and for example, 256 MB when the band capacity is 256 MB. In FIG. 8, the number of shingled magnetic recording band regions SBA is increased toward the distal end side of the arrow of the horizontal axis. In the horizontal axis of FIG. 8, the defined number SV is shown. FIG. 8 Shows changes MCL1 and MCL2 in the media cache capacity and change SCL in the shingled magnetic recording capacity. When the number of shingled magnetic recording band regions SBA is 0, in other words, the user data region 10a is entirely a conventional magnetic recording band region CBA, change MCL2 in the media cache capacity is the minimum capacity MIC. In the range where the number of shingled magnetic recording band regions SBA is 0 to the defined number SV, change MCL2 in the media cache capacity is linearly proportional to the number of shingled magnetic recording band regions SBA. In the range greater than or equal to the defined number SV, change MCL2 in the media cache capacity is the defined capacity MAC. The recording region management unit 620 changes the media cache capacity in accordance with the shingled magnetic recording capacity. In other words, the recording region management unit 620 changes the media cache capacity in accordance with the number of shingled magnetic recording band regions. In the example shown in FIG. 8, the recording region management unit 620 increases the media cache capacity in accordance with change MCL2 in the media cache capacity when the shingled magnetic recording capacity is increased in accordance with change SCL in the shingled magnetic recording capacity. In other words, the recording region management unit 620 increases the area of the media cache 10b in accordance with change MCL2 in the media cache capacity when the number of shingled magnetic recording band regions SBA (the area of the shingled magnetic recording region SR or the radial range of the shingled magnetic recording region SR) is increased in accordance with change SCL in the shingled magnetic recording capacity. For example, the recording region management unit 620 increases the number of shingled magnetic recording band regions SBA in accordance with change SCL in the shingled magnetic recording capacity, decreases the number of conventional magnetic recording band regions CBA in the disk 10, increases the area of the media cache 10b in accordance with change MCL2 in the media cache capacity and decreases the area of the user data region 10a in accordance with the increase in the area of the media cache 10b.

In the example shown in FIG. 8, the recording region management unit 620 decreases the media cache capacity in accordance with change MCL2 in the media cache capacity when the shingled magnetic recording capacity is decreased in accordance with change SCL in the shingled magnetic recording capacity. In other words, the recording region management unit 620 decreases the area of the media cache 10b in accordance with change MCL2 in the media cache capacity when the number of shingled magnetic recording band regions SBA is decreased in accordance with change SCL in the shingled magnetic recording capacity. For example, the recording region management unit 620 decreases the number of shingled magnetic recording band regions SBA in accordance with change SCL in the shingled magnetic recording capacity, increases the number of conventional magnetic recording band regions CBA in the disk 10, decreases the area of the media cache 10b in accordance with change MCL2 in the media cache capacity and increases the area of the user data region 10a in accordance with the decrease in the area of the media cache 10b.

FIG. 9 is a schematic diagram showing an example of change SCL in shingled magnetic recording capacity with respect to the number of shingled magnetic recording band regions SBA and change MCL3 in media cache capacity with respect to the number of shingled magnetic recording band regions SBA. In FIG. 9, the vertical axis shows shingled magnetic recording capacity and media cache capacity, and the horizontal axis shows the number of shingled magnetic recording band regions SBA. In FIG. 9, the shingled magnetic recording capacity and the media cache capacity are increased toward the distal end side of the arrow of the vertical axis. In the vertical axis of FIG. 9, the defined capacity MAC and the minimum capacity MIC are shown. In FIG. 9, the number of shingled magnetic recording band regions SBA is increased toward the distal end side of the arrow of the horizontal axis. In the horizontal axis of FIG. 9, number N1 (the number of shingled magnetic recording band regions SBA) and the defined number SV are shown. Number N1 is greater than 0 and less than the defined number SV. FIG. 9 shows changes MCL1 and MCL3 in the media cache capacity and change SCL in the shingled magnetic recording capacity. When the number of shingled magnetic recording band regions SBA is 0, in other words, the user data region 10a is entirely a conventional magnetic recording band region CBA, change MCL3 in the media cache capacity is the minimum capacity MIC. In the range where the number of shingled magnetic recording band regions SBA is 0 to number N1, change MCL3 in the media cache capacity is proportional to the number of shingled magnetic recording band regions SBA. For example, in the range where the number of shingled magnetic recording band regions SBA is 0 to number N1, the increase in change MCL3 in the media cache capacity is twice the increase in change SCL in the shingled magnetic recording capacity. In the range greater than or equal to number N1, change MCL3 in the media cache capacity is the defined capacity MAC.

In the example shown in FIG. 9, the recording region management unit 620 increases the media cache capacity in accordance with change MCL3 in the media cache capacity when the shingled, magnetic recording capacity is increased in accordance with change SCL in the shingled magnetic recording capacity. In other words, the recording region management unit 620 increases the area of the media cache 10b in accordance with change MCL3 in the media cache capacity when the number of shingled magnetic recording band regions SBA is increased in accordance with change SCL in the shingled magnetic recording capacity. For example, the recording region management unit 620 increases the number of shingled magnetic recording band regions SBA in accordance with change SCL in the shingled magnetic recording capacity, decreases the number of conventional magnetic recording band regions CBA in the disk 10, increases the area of the media cache 10b in accordance with change MCL3 in the media cache capacity and decreases the area of the user data region 10a in accordance with the increase in the area of the media cache 10b. As shown in FIG. 9, the media cache capacity is increased by an increase twice the increase in the shingled magnetic recording capacity. In this configuration, even when write commands or refresh commands are issued from the host 100, etc., more than expectation, a media cache capacity sufficient to perform a write process or a refresh process can be assured.

In the example shown in FIG. 9, the recording region management unit 620 decreases the media cache capacity in accordance with change MCL3 in the media cache capacity when the shingled magnetic recording capacity is decreased in accordance with change SCL in the shingled magnetic recording capacity. In other words, the recording region management unit 620 decreases the area of the media cache 10b in accordance with change MCL3 in the media cache capacity when the number of shingled magnetic recording band regions SBA is decreased in accordance with change SCL in the shingled magnetic recording capacity. For example, the recording region management unit 620 decreases the number of shingled magnetic recording band regions SBA in accordance with change SCL in the shingled magnetic recording capacity, increases the number of conventional magnetic recording band regions CBA in the disk 10, decreases the area of the media cache 10b in accordance with change MCL3 in the media cache capacity and increases the area of the user data region 10a in accordance with the decrease in the area of the media cache 10b.

FIG. 10 is a schematic diagram showing an example of change SCL in shingled magnetic recording capacity with respect to the number of shingled magnetic recording band regions SBA and change MCL4 in media cache capacity with respect to the number of shingled magnetic recording band regions SBA. In FIG. 10, the vertical axis shows shingled magnetic recording capacity and media cache capacity, and the horizontal axis shows the number of shingled magnetic recording band regions SBA. In FIG. 10, the shingled magnetic recording capacity and the media cache capacity are increased toward the distal end side of the arrow of the vertical axis. In the vertical axis of FIG. 10, the defined capacity MAC and the minimum capacity MIC are shown. In FIG. 10, the number of shingled magnetic recording band regions SBA is increased toward the distal end side of the arrow of the horizontal axis. In the horizontal axis of FIG. 10, number N2 (the number of shingled magnetic recording band regions SBA) and the defined number SV are shown. Number N2 is greater than 0 and less than the defined number SV. FIG. 10 shows changes MCL1 and MCL4 in the media cache capacity and change SCL in the shingled magnetic recording capacity. When the number of shingled magnetic recording band regions is 0, in other words, the user data region 10a is entirely a conventional magnetic recording band region CBA, change MCL4 in the media cache capacity is the minimum capacity MIC. In the range where the number of shingled magnetic recording band regions SBA is 0 to number N2, change MCL4 in the media cache capacity is proportional, to the number of shingled magnetic recording band regions SBA in an exponential manner. In the range greater than or equal to number N2, change MCL4 in the media cache capacity is the defined capacity MAC.

In the example shown in FIG. 10, the recording region management unit 620 increases the media cache capacity in accordance with change MCL4 in the media cache capacity when the shingled magnetic recording capacity is increased in accordance with change SCL in the shingled magnetic recording capacity. In other words, the recording region management unit 620 increases the area of the media cache 10b in accordance with change MCL4 in the media cache capacity when the number of shingled magnetic recording band regions SBA is increased in accordance with change SCL in the shingled magnetic recording capacity. For example, the recording region management unit 620 increases the number of shingled magnetic recording band regions SBA in accordance with change SCL in the shingled magnetic recording capacity, decreases the number of conventional magnetic recording band regions CBA in the disk 10, increases the area of the media cache 10b in accordance with change MCL4 in the media cache capacity and decreases the area of the user data region 10a in accordance with the increase in the area of the media cache 10b. As shown in FIG. 10, the media cache capacity is nonlinearly increased with respect to the shingled, magnetic recording capacity. In this configuration, for example, even when the write performance is low or an effect of server oscillation is exerted, a media cache capacity sufficient to perform a write process or a refresh process can be assured.

In the example shown in FIG. 10, the recording region management unit 620 decreases the media cache capacity in accordance with change MCL4 in the media cache capacity when the shingled magnetic recording capacity is decreased in accordance with change SCL in the shingled magnetic recording capacity. In other words, the recording region management unit 620 decreases the area of the media cache 10b in accordance with change MCL4 in the media cache capacity when the number of shingled magnetic recording band regions SBA is decreased in accordance with change SCL in the shingled magnetic recording capacity. For example, the recording region management unit 620 decreases the number of shingled magnetic recording band regions SBA in accordance with change SCL in the shingled magnetic recording capacity, increases the number of conventional magnetic recording band regions CBA in the disk 10, decreases the area of the media cache 10b in accordance with change MCL4 in the media cache capacity and decreases the area of the user data region 10a in accordance with the decrease in the area of the media cache 10b.

Figure 11:
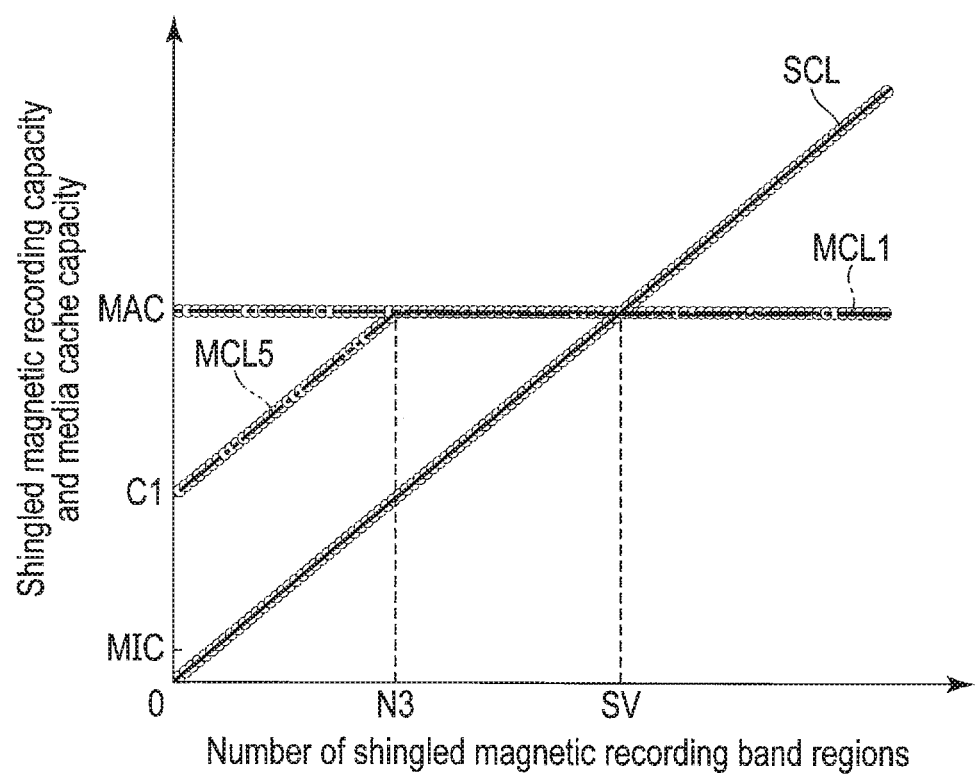
FIG. 11 is a schematic diagram showing an example of the change in shingled magnetic recording capacity with respect to the number of shingled magnetic recording band regions and the change in media cache capacity with respect to the number of shingled magnetic recording band regions.

FIG. 11 is a schematic diagram showing an example of change SCL in shingled magnetic recording capacity with respect to the number of shingled magnetic recording band regions SBA and change MCL5 in media cache capacity with respect to the number of shingled magnetic recording band regions SBA. In FIG. 11, the vertical axis shows shingled magnetic recording capacity and media cache capacity, and the horizontal axis shows the number of shingled magnetic recording band regions SBA. In FIG. 11, the shingled magnetic recording capacity and the media cache capacity are increased toward the distal end side of the arrow of the vertical axis. In the vertical axis of FIG. 11, the defined capacity MAC, media cache capacity C1 and the minimum capacity MIC are shown. Media cache capacity C1 is greater than the minimum capacity MIC and less than the defined capacity MAC. In FIG. 11, the number of shingled magnetic recording band regions SBA is increased toward the distal end side of the arrow of the horizontal axis. In the horizontal axis of FIG. 11, number M3 (the number of shingled magnetic recording band regions SBA) and the defined number SV are shown. Number M3 is greater than 0 and less than the defined number SV. FIG. 11 shows changes MCL1 and MCL5 in the media cache capacity and change SCL in the shingled magnetic recording capacity. When the number of shingled magnetic recording band regions is 0, in other words, the user data region 10a is entirely a conventional magnetic recording band region CBA, change MCL5 in the media cache capacity is media cache capacity C1. In the range where the number of shingled magnetic recording band regions SBA is 0 to number N3, change MCL5 in the media cache capacity is proportional to the number of shingled magnetic recording band regions SBA. In the range greater than or equal to number N3, change MCL5 in the media cache capacity is the defined capacity MAC.

In the example shown in FIG. 11, the recording region management unit 620 increases the media cache capacity in accordance with change MCL5 in the media cache capacity when the shingled magnetic recording capacity is increased in accordance with change SCL in the shingled magnetic recording capacity. In other words, the recording region management unit 620 increases the area of the media cache 10b in accordance with change MCL5 in the media cache capacity when the number of shingled magnetic recording band regions SBA is increased in accordance with change SCL in the shingled magnetic recording capacity. For example, the recording region management unit 620 increases the number of shingled magnetic recording band regions SBA in accordance with change SCL in the shingled magnetic recording capacity, decreases the number of conventional magnetic recording band regions CBA in the disk 10, increases the area of the media cache 10b in accordance with change MCL5 in the media cache capacity and decreases the area of the user data region 10a in accordance with the increase in the area of the media cache 10b. As shown in FIG. 11, setting is performed so as to be media cache capacity C1 when the number of shingled magnetic recording band regions is 0. In this configuration, for example, even if the conventional magnetic recording region CR is mostly used, and a small part of the conventional magnetic recording region CR which is not used is changed to a shingled magnetic recording region SR, a media cache capacity sufficient to perform a write process or a refresh process can be assured.

In the example shown in FIG. 11, the recording region management unit 620 decreases the media cache capacity in accordance with change MCL5 in the media cache capacity when the shingled magnetic recording capacity is decreased in accordance with change SCL in the shingled magnetic recording capacity. In other words, the recording region management unit 620 decreases the area of the media cache 10b in accordance with change MCL5 in the media cache capacity when the number of shingled magnetic recording band regions SBA is decreased in accordance with change SCL in the shingled magnetic recording capacity. For example, the recording region management unit 620 decreases the number of shingled magnetic recording band regions SBA in accordance with change SCL in the shingled magnetic recording capacity, increases the number of conventional magnetic recording band regions CSA in the disk 10, decreases the area of the media cache 10b in accordance with change MCL5 in the media cache capacity and increases the area of the user data region 10a in accordance with the decrease in the area of the media cache 10b.

Figure 12:
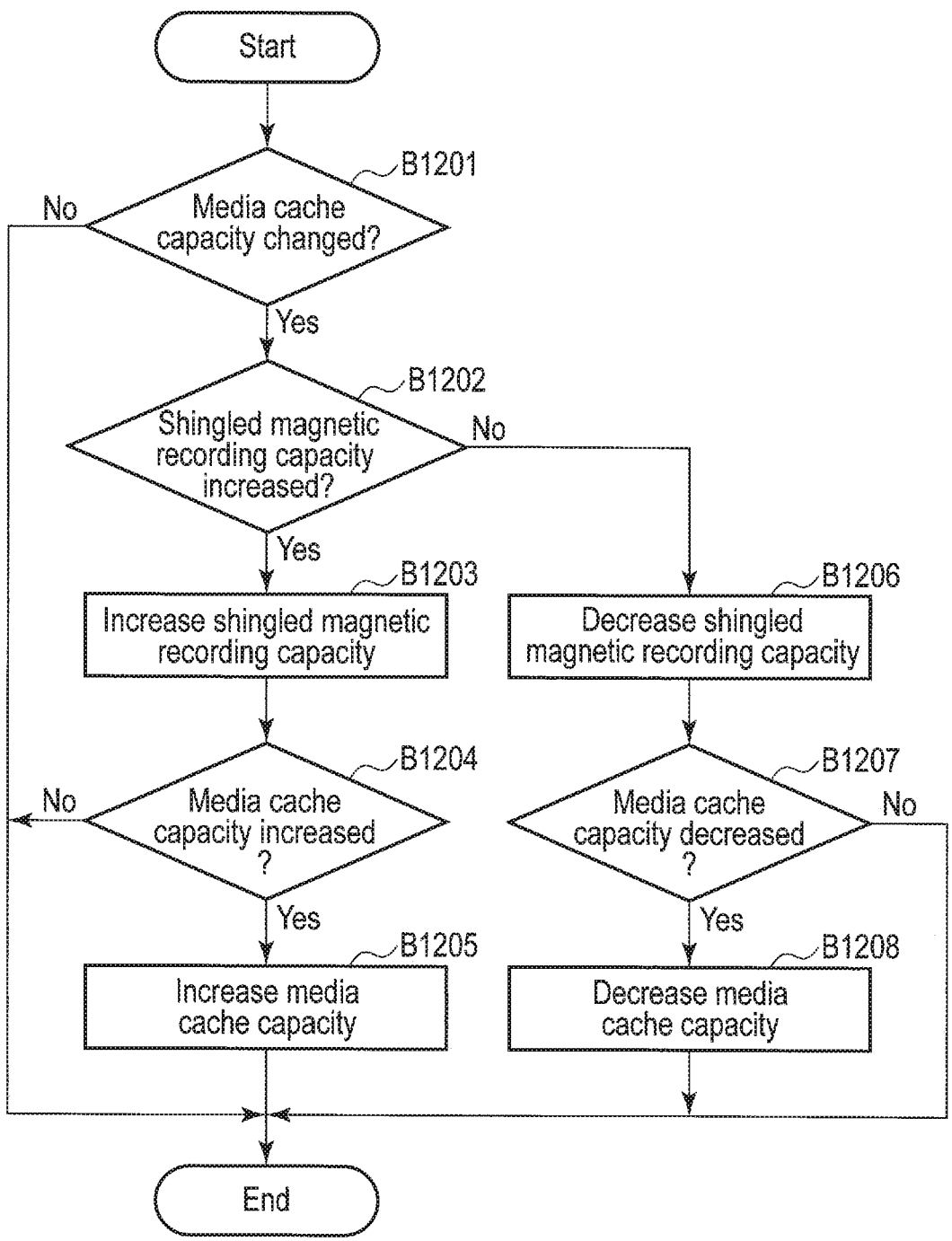
FIG. 12 is a flowchart showing an example of a method of setting the recording capacity of the disk according to the first embodiment.

FIG. 12 is a flowchart showing an example of a method of setting the recording capacity of the disk 10 according to the present embodiment.

The MPU 60 determines whether or not the media cache capacity should be changed (B1201). When the MPU 60 determines that the media cache capacity should not be changed (NO in B1201), the MPU 60 terminates the process. When the MPU 60 determines that the media cache capacity should be changed (YES in B1201), the MPU 60 determines whether or not the shingled magnetic recording capacity should be increased (B1202). When the MPU 60 determines that the shingled magnetic recording capacity should be changed (YES in B1202), the MPU 60 increases the shingled magnetic recording capacity (B1203). In other words, when the MPU 60 determines that the shingled magnetic recording region SR should be increased, the MPU 60 increases the shingled magnetic recording region SR. For example, when the MPU 60 determines that the shingled magnetic recording region SR should be increased, the MPU 60 increases the shingled magnetic recording region SR, and decreases the conventional magnetic recording region CR in accordance with the increase in the shingled magnetic recording region SR. The MPU 60 determines whether or not the media cache capacity should be increased (B1204). When the MPU 60 determines that the media cache capacity should not be increased (NO in B1204), the MPU 60 terminates the process. When the MPU 60 determines that the media cache capacity should be increased (YES in B1204), the MPU 60 increases the media cache capacity (B1205) and terminates the process. In other words, when the MPU 60 determines that the media cache 10b should be increased, the MPU 60 increases the media cache 10b. For example, when the MPU 60 determines that the media cache 10b should be increased, the MPU 60 increases the media cache 10b of the disk 10, decreases the user data region 10a and terminates the process.

When the MPU 60 determines that the shingled magnetic recording capacity should not be changed (NO in B1202), the MPU 60 decreases the shingled magnetic recording capacity (B1206). In other words, when the MPU 60 determines that the shingled magnetic recording region SR should be decreased, the MPU 60 decreases the shingled magnetic recording region SR. For example, when the MPU 60 determines that the shingled magnetic recording region SR should not be increased, the MPU 60 decreases the shingled magnetic recording region SR, and increases the conventional magnetic recording region CR in accordance with the decrease in the shingled magnetic recording region SR. The MPU 60 determines whether or not the media cache capacity should be decreased (B1207). When the MPU 60 determines that the media cache capacity should not be decreased (NO in B1207), the MPU 60 terminates the process. When the MPU 60 determines that the media cache capacity should be decreased (YES in B1207), the MPU 60 decreases the media cache capacity (B1203) and terminates the process. In other words, when the MPU 60 determines that the media cache 10b should be decreased, the MPU 60 decreases the media cache 10b. For example, when the MPU 60 determines that the media cache 10b should be decreased, the MPU 60 decreases the media cache 10b of the disk 10, increases the user data region 10a and terminates the process.

According to the first embodiment, the magnetic disk device 1 sets or changes the media cache 10b (or the media cache capacity) in accordance with the shingled magnetic recording capacity (the radial range of the shingled magnetic recording region SR or the area of the shingled magnetic recording region SR). In other words, the magnetic disk device 1 sets or changes the user data region 10a and the media cache 10b of the disk 10 in accordance with the shingled magnetic recording capacity. Since the user data region 10a and the media cache 10b can be set or changed, the magnetic disk device 1 can improve the format efficiency. Thus, the magnetic disk device 1 can effectively write data to the disk 10.

Now, this specification explains magnetic disk devices according to another embodiment and other modified examples. In the other embodiment and modified examples, the same portions as the above embodiment are denoted by the same reference numbers, detailed description thereof being omitted.

(Modified Example 1)

The magnetic disk device 1 of modified example 1 is different from the magnetic disk device 1 of the first embodiment in terms of the method of setting the user data region 10a.

The MPU 60 changes a conventional magnetic recording region CR to which a particular data capacity of the user data region 10a can be written to a shingled magnetic recording region SR to which the same data capacity as the data capacity which can be written to the conventional magnetic recording region CR can be written in accordance with an instruction from the host 100, etc., and sets or changes a region (redundant region) equivalent, to the difference between the conventional magnetic recording region CR and the shingled magnetic recording region SR so as to be or to at least one of the media cache 10b and a shingled magnetic recording region SR. For example, the MPU 60 changes the conventional magnetic recording band region CBA of the user data region 10a to a shingled magnetic recording band region SBA in accordance with an instruction from the host 100, etc., and sets or changes a redundant region excluding the shingled magnetic recording band region SBA from the conventional magnetic recording band region CBA so as to be or to at least one of the media cache 10b and a shingled magnetic recording band region SBA.

FIG. 13 is a schematic diagram showing examples of the state of the disk 10 according to modified example 1. FIG. 13 shows state 13A of the disk 10 and state 13B of the disk 10. In states 13A and 13B, the region of a part of the disk 10 is shown. In states 13A and 13B, for convenience sake, the region of a part of the disk 10 is shown in a rectangular shape extending in a radial direction. However, as shown in FIG. 1 and FIG. 2, the region is curved in a circumferential direction in practice. State 13A shows the state of a particular conventional magnetic recording band region CBA in the user data region 10a. In state 13A, radial range CBW of the conventional magnetic recording band region CBA is shown. State 13B shows the state of a particular shingled magnetic recording band region SBA in the user data region 10a and a particular media cache 10b. For example, the conventional magnetic recording band capacity of the conventional magnetic recording band region CBA of state 13A is equal to the shingled magnetic recording band capacity of the shingled magnetic recording band region SBA of state 13B. In state 13B, radial range CBW of the conventional magnetic recording band region CBA of state 13A, radial range SBW1 of the shingled magnetic recording band region SBA and radial range MW131 of the media cache 10b are shown. Radial range CBW of the conventional magnetic recording band region CBA is equivalent to the sum of radial range MW131 of the media cache 10b and radial range SBW1 of the shingled magnetic recording band region SBA. Radial range SBW1 of the shingled magnetic recording band region SBA is smaller than radial range CBW of the conventional magnetic recording band region CBA.

In the example shown in FIG. 13, the MPU 60 changes a part of the conventional magnetic recording band region CBA of the user data region 10a to a shingled magnetic recording band, region SBA in accordance with an instruction from the host 100, etc., and changes a redundant region excluding the shingled magnetic recording band region SBA from the conventional magnetic recording band region CBA to the media, cache 10b. In FIG. 13, this specification explains a case where state 13A is changed to state 13B. However, the MPU 60 may change state 13B to state 13A.

FIG. 14 is a schematic diagram showing examples of the state of the disk 10 according to modified example 1. FIG. 14 shows state 14A of the disk 10 and state 14B of the disk 10. In states 14A and 14B, the region of a part of the disk 10 is shown. In states 14A and 14B, for convenience sake, the region of a part of the disk 10 is shown in a rectangular shape extending in a radial direction. However, as shown in FIG. 1 and FIG. 2, the region is curved in a circumferential direction in practice. State 14A shows the state of a particular conventional magnetic recording band region CBA in the user data region 10a. In state 14A, radial range CBW of the conventional magnetic recording band region CBA is shown. State 14B shows the state of a shingled magnetic recording band region SBA (SBA1) in the user data region 10a, a part of a particular shingled magnetic recording band region SBA (in other words, a partial shingled magnetic recording band region) (PSA) and a particular media cache 10b. For example, the conventional magnetic recording band capacity of the conventional magnetic recording band region CBA of state 14A is equal to the shingled magnetic recording band capacity of the shingled magnetic recording band region SBA of state 14B. The shingled magnetic recording band capacity is greater than the capacity of data which can be written to the partial shingled magnetic recording band region PSA (in other words, a partial shingled magnetic recording band capacity). In state 14B, radial range CBW of the conventional magnetic recording band region CBA of state 14A, radial range SBW1 of the shingled magnetic recording band region SBA, radial range MW141 of the media cache 10b and radial range SBW2 of the partial shingled magnetic recording band region PSA are shown. Radial range CBW of the conventional magnetic recording band region CBA is equivalent to the sum of radial range MW141 of the media cache 10b, radial range SBW1 of the shingled magnetic recording band region SBA (SBA1) and radial range SBW2 of the partial magnetic recording band region PSA. Radial range SBW1 of the shingled magnetic recording band region SBA (SBA1) is greater than radial range SBW2 of the partial magnetic recording band region PSA.

In the example shown in FIG. 14, the MPU 60 changes a part of the conventional magnetic recording band region CBA of the user data region 10a to the shingled magnetic recording band region SBA (SBA1) in accordance with an instruction from the host 100, etc. The MPU 60 changes a part of a redundant region excluding the shingled magnetic recording band region SBA (SBA1) from the conventional magnetic recording band region CBA to the media cache 10b, and changes the region other than the media cache 10b of the redundant, region to the partial shingled magnetic recording band region PSA equivalent to a part of another shingled magnetic recording band region SBA different from the shingled magnetic recording band region SBA (SBA1). In FIG. 14, this specification explains a case where state 14A is changed to state 14B. However, the MPU 60 may change state 14B to state 14A.

Figure 15:
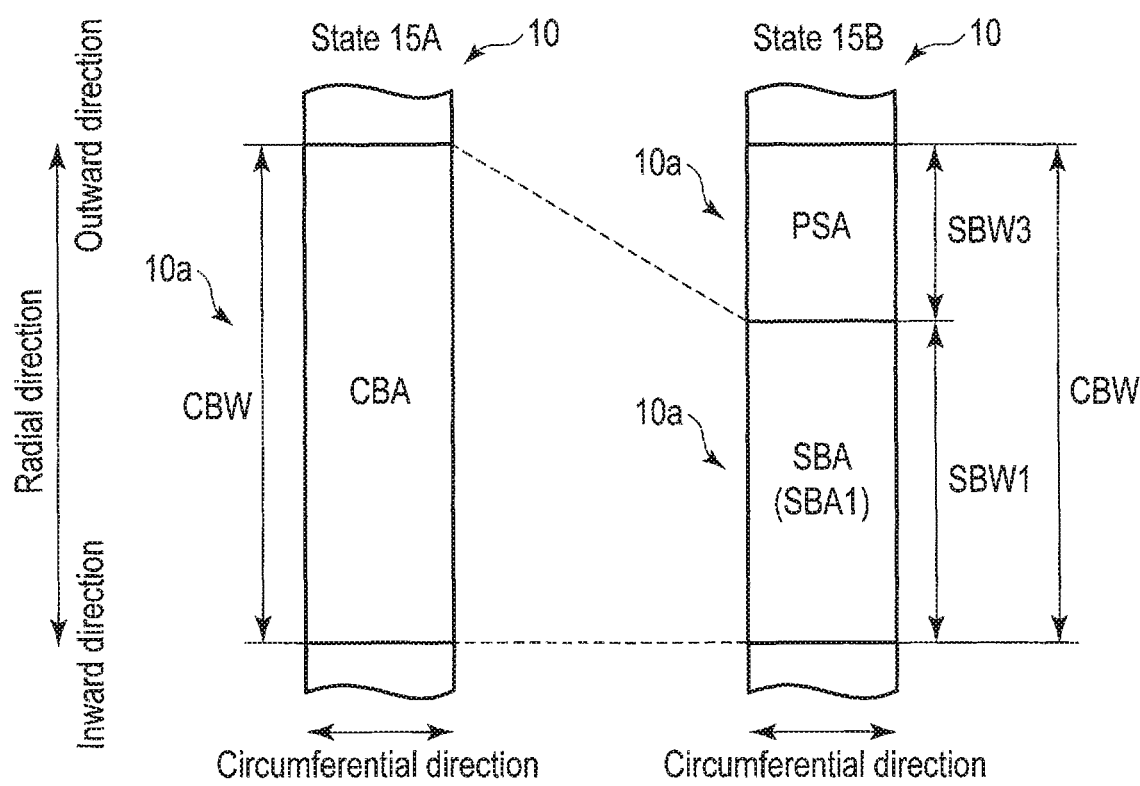
FIG. 15 is a schematic diagram showing examples of the state of the disk according to modified example 1.

FIG. 15 is a schematic diagram showing examples of the state of the disk 10 according to modified example 1. FIG. 15 shows state 15A of the disk 10 and state 15B of the disk 10. In states 15A and 15B, the region of a part of the disk 10 is shown. In states 15A and 15B, for convenience sake, the region of a part of the disk 10 is shown in a rectangular shape extending in a radial direction. However, as shown in FIG. 1 and FIG. 2, the region is curved in a circumferential direction in practice. State 15A shows the state of a particular conventional magnetic recording band region CBA in the user data region 10a. In state 15A, radial range CBW of the conventional magnetic recording band region CBA is shown. State 15B shows the state of a particular shingled magnetic recording band region SBA (SBA1) and a particular partial shingled, magnetic recording band region PSA in the user data region 10a. For example, the conventional magnetic recording band capacity of the conventional magnetic recording band region CBA of state 15A is equal to the shingled magnetic recording band capacity of the shingled magnetic recording band region SBA of state 15B. The shingled magnetic recording band capacity of state 15B is greater than the partial shingled magnetic recording band capacity of state 15B. In state 15B, radial range CBW of the conventional magnetic recording band region CBA of state 15A, radial range. SBW1 of the shingled magnetic recording band region SBA and radial range SBW3 of the partial shingled magnetic recording band region PSA are shown. Radial range CBW of the conventional magnetic recording band region CBA is equivalent to the sum of radial range SBW1 of the shingled magnetic recording band region SBA (SBA1) and radial range SBW3 of the partial magnetic recording band region PSA. Radial range SBW1 of the shingled magnetic recording band region SBA (SBA1) is greater than radial range SBW3 of the partial magnetic recording band region PSA.

In the example shown in FIG. 15, the MPU 60 changes a part of the conventional magnetic recording band region CBA of the user data region 10a to the shingled magnetic recording band region SBA1 in accordance with an instruction from the host 100, etc. The MPU 60 changes a redundant region excluding the shingled magnetic recording band region SBA1 from the conventional magnetic recording band region CBA to the partial shingled magnetic recording band region PSA equivalent to a part of another shingled magnetic recording band region SBA different from the shingled magnetic recording band region SBA1. In FIG. 15, this specification explains a case where state 15A is changed to state 15B. However, the MPU 60 may change state 15B to state 15A.

FIG. 16 is a schematic diagram showing examples of the state of the disk 10 according to modified example 1. FIG. 16 shows state 16A of the disk 10 and state 16B of the disk 10. In states 16A and 16B, the region of a part of the disk 10 is shown. In states 16A and 16B, for convenience sake, the region of a part of the disk 10 is shown in a rectangular shape extending in a radial direction. However, as shown in FIG. 1 and FIG. 2, the region is curved in a circumferential direction in practice. State 16A shows the state of two conventional magnetic recording band regions CBA (CBA1 and CBA2) adjacent to each other in a radial direction in the user data region 10a. In state 16A, radial ranges CBW of conventional magnetic recording band regions CB1 and CBA2 are shown. State 16B shows the state of a particular shingled magnetic recording band region SBA (SBA1) in the user data region 10a and particular media caches 10b. For example, the conventional magnetic recording band capacity of the conventional magnetic recording band region CBA of state 16A is equal to the shingled magnetic recording band capacity of the shingled magnetic recording band region SBA of state 16B. In state 16B, radial ranges CBW of conventional magnetic recording band regions CBA1 and CBA2 of state 16A, radial range SBW1 of the shingled magnetic recording band region SBA (SBA1), radial range MW131 of the media cache 10b and radial range MW161 of the media cache 10b are shown. Radial range CBW of conventional magnetic recording region CBA1 is equivalent to the sum of radial range MW131 of the media cache 10b and radial range SBW1 of the shingled magnetic recording band region SBA. Radial range CBW of conventional magnetic recording band region CBA2 is equivalent to radial range MW161 of the media cache 10b. Radial range CBW of conventional magnetic recording band region CBA2 is the same as radial range MW161 of the media cache 10b.

In the example shown in FIG. 16, the MPU 60 changes a part of conventional magnetic, recording band region CBA1 of the user data region 10a to the shingled magnetic recording band region SBA1 in accordance with an instruction from the host 100, etc., and changes a redundant region excluding the shingled magnetic recording band region SBA1 from conventional magnetic recording band region CBA1 to the media cache 10b.

In the example shown in FIG. 16, the MPU 60 changes conventional magnetic recording band region CBA2 of the user data region 10a to the media cache 10b in accordance with an instruction from the host 100, etc. For example, the MPU 60 provides a media cache 10b corresponding to conventional magnetic recording band region CBA1 and a media cache 10b corresponding to conventional magnetic recording band region CBA2 in regions corresponding to conventional magnetic recording band regions CBA1 and CBA2 so as to be adjacent to each other in a radial direction. In FIG. 16, this specification explains a case where state 16A is changed to state 16B. However, the MPU 60 may change state 16B to state 16A.

FIG. 17 is a schematic diagram showing examples of the state of the disk 10 according to modified example 1. FIG. 17 shows state 17A of the disk 10 and state 17B of the disk 10. In states 17A and 17B, the region of a part of the disk 10 is shown. In states 17A and 17B, for convenience sake, the region of a part of the disk 10 is shown in a rectangular shape extending in a radial direction. However, as shown, in FIG. 1 and FIG. 2, the region is curved in a circumferential direction in practice. State 17A shows the state of two conventional magnetic recording band regions CBA (CBA1 and CBA2) adjacent to each other in a radial direction in the user data region 10a. In state 17A, radial ranges CBW of conventional magnetic recording band regions CBA1 and CBA2 are shown. State 17B shows the state of particular shingled magnetic recording band regions SBA (SBA1 and SBA2) in the user data regions 10a and particular media caches 10b. For example, the conventional magnetic recording band capacity of the conventional magnetic recording band region CBA of state 17A is equal to the shingled magnetic recording band capacity of the shingled magnetic recording band region SBA of state 17B. In state 17B, radial ranges CBW of conventional magnetic recording band regions CBA1 and CBA2 of state 17A, radial ranges SBW1 of shingled magnetic recording band regions SBA1 and SBA2 and radial ranges MW131 of the media caches 10b are shown. Radial range CBW of conventional magnetic recording band region CBA2 is equivalent to the sum of radial range MW131 of the media cache 10b and radial range SBW1 of shingled magnetic recording band region SBA1. Radial range CBW of conventional magnetic recording band region CBA2 is equivalent to the sum of radial range MW131 of the media cache 10b and radial range SBW1 of shingled magnetic recording band region SBA2.

In the example shown in FIG. 17, the MPU 60 changes a part of conventional magnetic recording band region CBA1 of the user data region 10a to shingled magnetic recording band region SBA1 in accordance with an instruction from the host 100, etc., and changes a redundant region excluding shingled magnetic recording band region SBA1. from conventional magnetic recording band region CBA1 to the media cache 10b.

In the example shown in FIG. 17, the MPU 60 changes a part of conventional magnetic recording band region CBA2 of the user data region 10a to shingled magnetic; recording band region SBA2 in accordance with an instruction from the host 100, etc., and changes a redundant region excluding shingled magnetic recording band region SBA2 from conventional magnetic recording band region CBA2 to the media cache 10b. For example, the MPU 60 provides a media cache 10b corresponding to conventional magnetic recording band region CBA1 and a media cache 10b corresponding to conventional magnetic recording band region CBA2 in regions corresponding to conventional magnetic recording band regions CBA1 and CBA2 so as to be adjacent to each other in a radial direction. In FIG. 17, this specification explains a case where state 17A is changed to state 17B, However, the MPU 60 may change state 17B to state 17A.

FIG. 18 is a schematic diagram showing examples of the state of the disk 10 according to modified example 1. FIG.

18 shows state 18A of the disk 10 and state 18B of the disk 10. In states 18A and 18B, the region of a part of the disk 10 is shown. In states 18A and 18B, for convenience sake, the region of a part of the disk 10 is shown in a rectangular shape extending in a radial direction. However, as shown in FIG. 1 and FIG. 2, the region is curved in a circumferential direction in practice. State 18A shows the state of two conventional magnetic recording band regions CBA (CBA1 and CBA2) adjacent, to each other in a radial direction in the user data region 10a. In state 15A, radial ranges CBW of conventional magnetic recording band regions CBA1 and CBA2 are shown. State 18B shows the stats of the shingled magnetic recording band regions SBA (SBA1 and SBA2) and the partial shingled magnetic recording band region PSA in the user data region 10a. For example, the conventional magnetic recording band capacity of the conventional magnetic recording band region CBA of state 18A is equal to the shingled magnetic recording band capacity of the shingled magnetic recording band region SBA of state 18B. In state 18B, sum 2CBW of the radial ranges of conventional magnetic recording band regions CBA1 and CBA2 of state 18A, radial ranges SBW1 of shingled magnetic recording band regions SBA1 and SBA2 and radial range SBW4 of the partial shingled magnetic recording band region PSA are shown. Sum 2CBW of the radial ranges of conventional magnetic recording band regions CBA1 and CBA2 is equivalent to the sum of radial range SBW1 of shingled magnetic recording band region SBA1, radial range SBW1 of shingled magnetic recording band region SBA2 and radial range SBW4 of the partial shingled magnetic recording band region PSA. Radial range SBW1 of each of shingled magnetic recording band regions SBA1 and SBA2 is larger than radial range SBW4 of the partial shingled magnetic recording band region PSA.

In the example shown in FIG. 18, the MPU 60 changes conventional magnetic recording band region CBA1 of the user data region 10a to shingled magnetic recording band region SBA1 in accordance with an instruction from the host 100, etc. The MPU 60 changes conventional magnetic recording band region CBA2 of the user data region 10a to shingled magnetic recording band region SBA2 in accordance with an instruction from the host 100, etc. The MPU 60 changes a redundant region excluding shingled magnetic recording band regions SBA1 and SBA2 from regions corresponding to conventional magnetic recording band regions CBA1 and CBA2 to a partial shingled magnetic recording band region PSA equivalent to a part of a shingled magnetic recording band region SBA different from shingled magnetic recording band regions SBA1 and SBA2. For example, the MPU 60 provides shingled magnetic recording band region SBA1 and shingled magnetic recording band region SBA2 in regions corresponding to conventional magnetic recording band regions CBA1 and CBA2 so as to be adjacent to each other in a radial direction. The MPU 60 provides shingled magnetic recording band region SBA2 and the partial shingled magnetic recording band region PSA in regions corresponding to conventional magnetic recording band regions CBA1 and CBA2 so as to be adjacent to each other in a radial direction. In FIG. 18, this specification explains a case where state 18A is changed to state 18B. However, the MPU 60 may change state 18B to state 15A.

FIG. 19 is a flowchart showing an example of a method of setting the recording region of the disk 10 according to modified example 1.

The MPU 60 determines whether or not a conventional magnetic recording band region CBA should be changed (set) to (so as to be) a shingled magnetic recording band region SBA (B1901). When the MPU 60 determines that a conventional magnetic recording band region CBA should not be changed to a shingled magnetic recording band region SBA (NO in B1901), the MPU 60 terminates the process. When the MPU 60 determines that a conventional magnetic recording band region CBA should be changed to a shingled magnetic recording band region SBA (YES in B1901), the MPU 60 determines whether or not a redundant region excluding the shingled magnetic recording band region SBA from the conventional magnetic recording band region CBA should be entirely changed to a shingled magnetic recording band region SBA (B1902). When the MPU 60 determines that a redundant region should be entirely changed to a shingled magnetic recording band region SBA (YES in B1902), the MPU 60 changes the entire part of the redundant region to a shingled magnetic recording band region SBA (B1903) and terminates the process. When the MPU 60 determines that a redundant region should not be entirely changed to a shingled magnetic recording band region SBA (NO in B1902), the MPU 60 determines whether or not the redundant region should be entirely changed to the media cache 10b (B1904), When the MPU 60 determines that the redundant region should he entirely changed to the media cache 10b (YES in B1904), the MPU 60 changes the entire part of the redundant region to the media cache 10b (B1905) and terminates the process. When the MPU 60 determines that the redundant region should not be entirely changed to the media cache 10b (NO in B1904), the MPU 60 changes a part of the redundant region to a shingled magnetic recording band region SBA (B1906). The MPU 60 changes a region excluding the shingled magnetic recording band region SBA from the redundant region to the media cache 10b (B1907) and terminates the process. According to modified example 1, when the magnetic disk device 1 changes a conventional magnetic recording band region CBA to a shingled magnetic recording band region SBA, the magnetic disk device 1 changes or sets a redundant region excluding the shingled magnetic recording band region SBA from the conventional magnetic recording band region CBA to or so as to be at least one of the media cache 10b and the shingled magnetic recording band region SBA. Thus, the magnetic disk device 1 can efficiently write data to the disk 10.

(Modified Example 2)

The magnetic disk device 1 of modified example 2 is different from the magnetic disk devices 1 of the above first embodiment and modified example 1 in respect that a plurality of media caches 10b are provided at intervals in a radial direction in the disk 10.

The MPU 60 comprises a plurality of media caches 10b provided at intervals in a radial direction in the disk 10. In other words, the MPU 60 comprises a plurality of user data regions 10a provided at intervals in a radial direction in the disk 10 and a plurality of media caches 10b provided at intervals in a radial direction in the disk 10. The MPU 60 collects the media caches 10b provided at intervals in a radial direction in the disk 10 into one region when a process such as a command process is not performed, or when the number of processes such as a command process is less, for example, at an idling time. For example, the MPU 60 collects the media caches 10b provided at intervals in a radial direction in the disk 10 into a region adjacent to the system region 10c located in the outermost circumference of the disk 10. The MPU 60 provides a plurality of user data regions 10a and a plurality of media caches 10b so as to be mixed in the disk 10 when a process such as a command process is performed. In other words, the MPU 60 sets at least one media cache 10b between a plurality of user data regions 10a in the disk 10 when a process such as a command process is performed.

Figure 20:
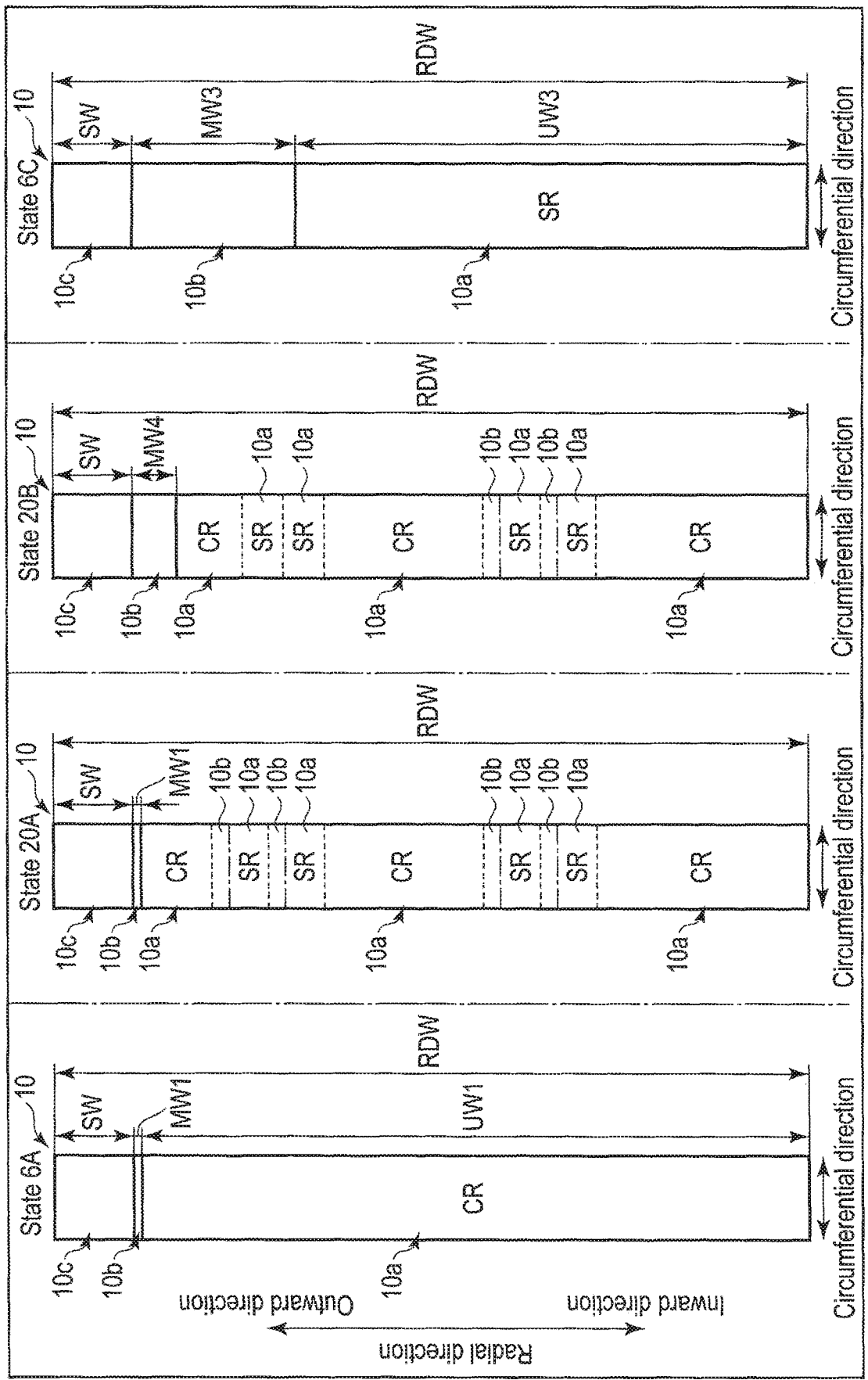
FIG. 20 is a schematic diagram showing examples of the state of the disk according to modified example 2.

FIG. 20 is a schematic diagram showing examples of the state of the disk 10 according to modified example 2. FIG. 20 shows state 6A of the disk 10, state 20A of the disk 10, state 20B of the disk 10 and state 6C of the disk 10. In states 20A and 20B, the region of a part of the disk 10 is shown. In states 20A and 20B, for convenience sake, the region of a part of the disk 10 is shown in a rectangular shape extending in a radial direction. However, as shown in FIG. 1 and FIG. 2, the region is curved in a circumferential direction in practice. State 20A shows the state of the disk 10 comprising a plurality of media caches 10b provided at intervals in a radial direction. In state 20A, radial range RDW of the disk 10, radial range MW1 of the media cache (outermost media cache) 10b located in the outermost direction of the media caches 10b and radial range SW of the system region 10c are shown. State 20B shows the state of the disk 10 in which the media caches 10b shown in state 20A are partially collected. In state 20B, radial range RDW of the disk 10, radial range MW4 of the outermost media cache 10b and radial range SW of the system region 10c are shown. Radial range MW4 of the outermost media cache 10b in state 20B is larger than radial range MW1 of the outermost media cache 10b in state 20A. Radial range MW3 of the media cache 10b in, state 6C is larger than radial range MW4 of the outermost media cache 10b in state 20B.

When the MPU 60 receives an instruction for changing a shingled magnetic recording capacity corresponding to state 6A to a shingled magnetic recording capacity corresponding to state 20A from the host 100, etc., the MPU 60 changes some conventional magnetic recording band regions CBA in the conventional magnetic recording region CR in state 6A to shingled magnetic recording band regions SR (shingled magnetic recording band regions SBA). In the example shown in FIG. 20, when the MPU 60 receives an instruction for changing a shingled magnetic recording capacity corresponding to the radial range (or area) of the shingled magnetic recording region SR in state 6A to a shingled, magnetic recording capacity corresponding to the radial range (or area) of the shingled magnetic recording region SR in state 20A from the host 100, etc., the MPU 60 changes a plurality of conventional magnetic recording band regions CBA in the conventional magnetic recording region CR in state 6A to a plurality of shingled magnetic recording regions SR (shingled magnetic recording band regions SBA), respectively, and changes a plurality of redundant regions corresponding to the shingled magnetic recording regions SR (shingled magnetic recording band regions SBA), respectively, to a plurality of media caches 10b, respectively. In other words, when the MPU 60 receives an instruction for changing a shingled magnetic recording capacity corresponding to the radial range (or area) of the shingled magnetic recording region SR in state 6A to a shingled magnetic recording capacity corresponding to the radial range (or area) of the shingled magnetic recording region SR in state 20A from the host 100, etc., the MPU 60 changes a plurality of conventional magnetic recording band regions CBA in the conventional magnetic recording region CR in state 6A to a plurality of shingled magnetic recording regions SR (shingled magnetic recording band regions SBA), respectively, and sets or provides a plurality of media caches 10b adjacent to the shingled magnetic recording regions SR (shingled magnetic recording band regions SBA), respectively, in a radial direction.

When a process such as a command process is not performed, or the number of processes such as a command process is less, for example, at an idling time, the MPU 60 collects some of the media caches 10b provided at intervals in a radial direction as shown in state 20A into the outermost media cache 10b as shown in state 20B. In other words, when a process such as a command process is performed, the MPU 60 provides a plurality of media caches 10b adjacent to the radial direction of a plurality of shingled magnetic recording regions SR provided at intervals in the radial direction of the disk 10.

Further, the MPU 60 collects a plurality of media caches 10b provided at intervals in a radial direction as shown in state 20B into the outermost media cache 10b as shown in state 6C when no other processes are performed or the number of other processes is less, for example, at an idling time.

According to modified example 2, the magnetic disk device 1 comprises a plurality of media caches 10b provided at intervals in a radial direction in the disk 10. The MPU 60 collects a plurality of media caches 10b provided at intervals in a radial direction, in the disk 10 into one region of the disk 10 when no other processes are performed or the number of other processes is less, for example, at an idling time. Thus, the magnetic disk device 1 can efficiently write data to the disk 10.

(Modified Example 3)

The magnetic disk device 1 of modified example 3 is different from the magnetic disk devices 1 of the above first embodiment, modified example 1 and modified example 2 in terms of the method of setting media cache capacity.

The MPU 60 is allowed to change the media cache capacity so as to be greater than the defined capacity in accordance with the shingled magnetic recording capacity.

FIG. 21 is a schematic diagram showing an example of change SCL in shingled magnetic recording capacity with, respect to the number of shingled magnetic recording band regions SBA and change MCL6 in media cache capacity with respect to the number of shingled magnetic recording band regions SBA. In FIG. 21, the vertical axis shows shingled magnetic recording capacity and media cache capacity, and the horizontal axis shows the number of shingled magnetic recording band regions SBA. In FIG. 21, the shingled magnetic recording capacity and the media cache capacity are increased toward the distal end side of the arrow of the vertical axis. In the vertical axis of FIG. 21, media cache capacity C2, the defined capacity MAC and the minimum capacity MIC are shown. Media cache capacity C2 is greater than the defined capacity MAC. In FIG. 21, the number of shingled magnetic recording band regions SBA is increased toward the distal end side of the arrow of the horizontal axis. In the horizontal axis of FIG. 21, the defined number SV and number N4 (the number of shingled magnetic recording band regions SBA) are shown. Number N4 is greater than the defined number SV. FIG. 21 shows changes MCL1 and MCL6 in the media cache capacity and change SCL in the shingled magnetic recording capacity. When the number of shingled magnetic recording band regions SBA is 0, in other words, the user data region 10a is entirely a conventional magnetic recording band region CBA, change MCL6 in the media cache capacity is the minimum capacity MIC. In the range where the number of shingled magnetic recording band regions SBA is 0 to number N4, change MCL6 in the media cache capacity is linearly proportional to the number, of shingled magnetic recording band regions SBA. In the range where the number of shingled magnetic recording band regions SBA is greater than or equal to number N4, change MCL6 in the media cache capacity is media cache capacity C2.

In the example shown in FIG. 21, the MPU 60 increases the media cache capacity in accordance with change MCL6 in the media cache capacity when the shingled magnetic recording capacity is increased in accordance with change SCL in the shingled magnetic recording capacity. In other words, the MPU 60 increases the area of the media cache 10b in accordance with change MCL6 in the media cache capacity when the number of shingled magnetic recording band regions SBA is increased in accordance with change SCL in the shingled magnetic recording capacity. For example, the MPU 60 increases the number of shingled magnetic recording band regions SBA in accordance with change SCL in the shingled magnetic recording capacity, decreases the number of conventional magnetic recording band regions CBA in the disk 10, increases the area of the media cache 10b in accordance with change MCL6 in the media cache capacity and decreases the area of the user data region 10a in accordance with the increase in the area of the media cache 10b.

In the example shown in FIG. 21, the MPU 60 decreases the media cache capacity in accordance with change MCL6 in the media cache capacity when the shingled magnetic recording capacity is decreased in accordance with change SCL in the shingled magnetic recording capacity. In other words, the MPU 60 decreases the area of the media cache 10b in accordance with change MCL6 in the media cache capacity when the number of shingled magnetic recording band regions SBA is decreased in accordance with change SCL in the shingled magnetic recording capacity. For example, the MPU 60 decreases the number of shingled magnetic recording band regions SBA in accordance with change SCL in the shingled magnetic recording capacity, increases the number of conventional magnetic recording band regions CBA in the disk 20, decreases the area of the media cache 10b in accordance with change MCL6 in the media cache capacity and increases the area of the user data region 10a in accordance with the increase in the area of the media cache 10b.

According to modified example 3, the magnetic disk device 1 can change the media cache capacity so as to be greater than the defined capacity in accordance with the shingled magnetic recording capacity. Thus, the magnetic disk device 1 can efficiently write data to the disk 10.

(Second Embodiment)

The magnetic disk device 1 of a second embodiment is different from the magnetic disk devices 1 of the above first embodiment and modified examples 1 to 3 in terms of the method of setting a media cache 10b.

When an MPU 60 sets (or changes) a particular region in a user data region 10a (in other words, the target user data region) so as to be (or to) a media cache 10b by increasing the shingled magnetic recording capacity, the MPU 60 determines whether or not the target user data region can be set so as to be (or changed to) a media cache 10b. When the MPU 60 determines that the target user data region can be set so as to be (or changed to) a media cache 10b, the MPU 60 sets (or changes) the target user data region so as to be (or to) a media cache 10b. For example, when the data written to the target user data region is data which can be deleted, the MPU 60 determines that the target user data region can be set so as to be (or changed to) a media cache 10b. For example, when the data written to the target user data region is data which should not be deleted, the MPU 60 determines that the target user data region cannot be set so as to be (or changed to) a media cache 10b.

Figure 22:
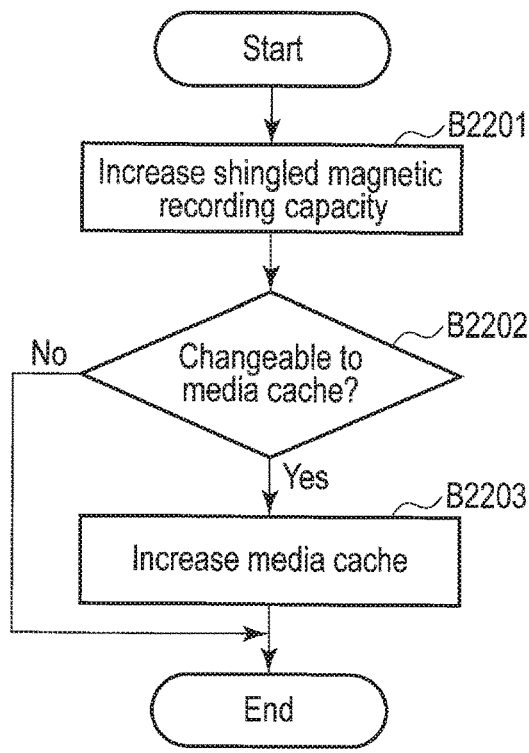
FIG. 22 is a flowchart showing an example of a method of setting a media cache according to a second embodiment.

FIG. 22 is a flowchart showing an example of a method of setting the media cache 10b according to the second embodiment.

The MPU 60 increases a shingled magnetic recording region (B2201), and determines whether or not the target user data region can be changed to (or set so as to be) a media cache 10b (B2202). When the MPU 60 determines that the target user data region cannot foe changed to (or set so as to be) a media cache 10b (NO in B2202), the MPU 60 terminates the process. When the MPU 60 determines that the target user data region can be changed to (or set so as to be) a media cache 10b (YES in B2202), the MPU 60 changes (or sets) the target user data region to a media cache 10b (B2203) and terminates the process.

When the magnetic disk device 1 of the second embodiment sets or changes the target user data region so as to be or to a media cache 10b by increasing the shingled magnetic recording capacity, the magnetic disk device 1 determines whether or not the target user data region can be set so as to be (or changed to) a media cache 10b. When the magnetic disk device 1 determines that the target user data region can be changed to a media cache 10b, the magnetic disk device 1 sets or changes the target user data region so as to be or to a media cache 10b. Thus, the magnetic disk device 1 can improve reliability.

(Modified Example 4)

The magnetic disk device 1 of modified example 4 is different from the magnetic disk devices 1 of the above first embodiment, second embodiment and modified examples 1 to 3 in terms of the method of setting the media cache 10b.

When the MPU 60 sets (or changes) a particular region in the media cache 10b (in other words, the target media cache region) so as to be (or to) a user, data region 10a by decreasing the shingled magnetic recording capacity, the MPU 60 determines whether or not the target media cache region can be set so as to be (or changed to) a user data region 10a. When the MPU 60 determines that the target media cache region can be set so as to be (or changed to) a user data region 10a, the MPU 60 sets (or changes) the target media cache region so as to be (or to) a user data region 10a. For example, when the data written to the target media cache region is data which can be deleted, the MPU 60 determines that the target media cache region can be set so as to be (or changed to) a user data region 10a. For example, when the data written to the target media cache region is data which should not be deleted, the MPU 60 determines that the target media cache region cannot be set so as to be (or changed to) a user data region 10a.

Figure 23:
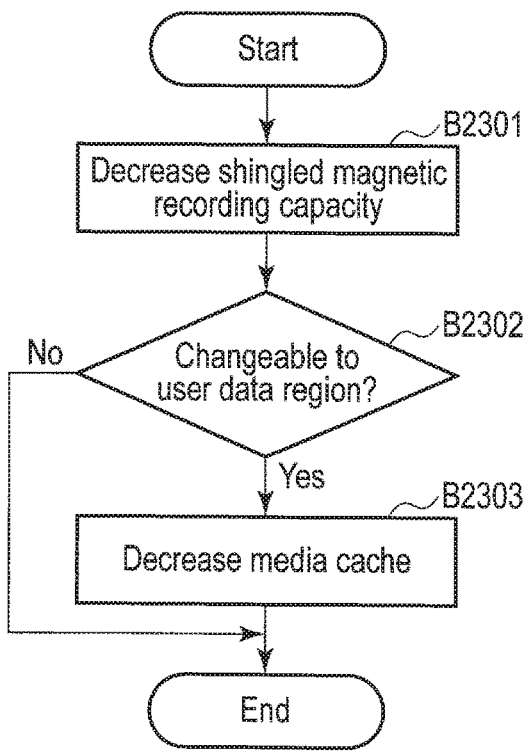
FIG. 23 is a flowchart showing an example of the method of setting the media cache according to modified example 4.

FIG. 23 is a flowchart showing an example of the method of setting the media cache 10b according to modified example 4.

The MPU 60 decreases a shingled magnetic recording region (B2301), and determines whether or not the target media cache region can be changed to (or set so as to be) a user data region 10a (B2202). When the MPU 60 determines that the target media cache region cannot be changed to (or set so as to be) a user data region 10a (NO in B2302), the MPU 60 terminates the process. When the MPU 60 determines that the target, media cache region can be changed to (or set so as to be) a user data region 10a (YES in B2302), the MPU 60 changes (or sets) the target media cache region to (or so as to be) a user data region 10a (B2302) and terminates the process.

When the magnetic disk device 1 of modified example 4 sets or changes the target media cache region so as to be or to a user data region 10a by increasing the shingled magnetic recording capacity, the magnetic disk device 1 determines whether or not the target media cache region can be set so as to be or changed to a user data region 10a. When the magnetic disk device 1 determines that the target media cache region can be changed to or set so as to be a user data region 10a, the magnetic disk device 1 sets or changes the target media cache region so as to be or to a user data region 10a. Thus, the magnetic disk device 1 can improve reliability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a disk comprising a first region and a second region to which data before written to the first region is temporarily written;
a head which writes data to the disk and reads data from the disk; and
a controller which selectively performs conventional magnetic recording for writing a track at an interval in a radial direction of the disk and shingled magnetic recording for writing a track so as to overlap in the radial direction, and changes a cache data capacity of data which can be written to the second region in accordance with a first write capacity of data which can be written to the first region by the shingled magnetic recording.

2. The magnetic disk device of claim .1, wherein the controller changes a first area of the first region and a second area of the second region in accordance with the first write capacity.

3. The magnetic disk device of claim 1, wherein the controller increases the cache data capacity when the first write capacity is increased.

4. The magnetic disk device of claim 3, wherein the controller decreases a second write capacity of data which can be written to the first region by the conventional magnetic recording when the first write capacity is increased.

5. The magnetic disk device of claim 1, wherein the controller makes the cache data capacity constant when the first write capacity is greater than or equal to a threshold.

6. The magnetic disk device of claim 1, wherein the controller decreases the cache data capacity when the first write capacity is decreased.

7. The magnetic disk device of claim 6, wherein the controller increases a second write capacity of data which can be written to the first region by the conventional magnetic recording when the first write capacity is decreased.

8. The magnetic disk device of claim 1, wherein the controller sets the cache data capacity so as to foe a first value greater than 0 when the first write capacity is 0.

9. The magnetic disk device of claim 1, wherein the second region includes a plurality of third regions spaced apart from each other at intervals in the radial direction.

10. The magnetic disk device of claim 8, wherein the controller collects the third regions into an outer circumferential region located on an outer circumferential side of the disk.

11. A magnetic disk device comprising:
a disk comprising a first region and a second region to which data before written to the first region is temporarily written;
a head which writes data to the disk and reads data from the disk; and
a controller which selectively performs conventional magnetic recording for writing a track at an interval in a radial direction of the disk and shingled magnetic recording for writing a track so as to overlap in the radial direction, and changes a first area of the second region in accordance with a first write capacity which can foe written to the first region by the shingled magnetic recording.

12. The magnetic disk device of claim 11, wherein the controller increases the first area when the first write capacity is increased, and decreases the first area when the first write capacity is decreased.

13. A method of setting a recording capacity, the method applied to a magnetic disk device comprising: a disk comprising a first region and a second region to which data before written to the first region is temporarily written; and a head which writes data to the disk and reads data from the disk, the method comprising:
selectively performing conventional magnetic recording for writing a track at an interval in a radial direction of the disk and shingled magnetic recording for writing a track so as to overlap in the radial direction; and
changing a cache data capacity of data which can be written to the second region in accordance with a first write capacity of data which can be written to the first region by the shingled magnetic recording.

14. The method of claim 13, further comprising:
changing a first area of the first region and a second area of the second region in accordance with the first write capacity.

15. The method of claim 13, further comprising:
increasing the cache data capacity when the first write capacity is increased.

16. The method of claim 15, further comprising:
decreasing a second write capacity of data which can be written to the first region by the conventional magnetic recording when the first write capacity is increased.

17. The method of claim 13, further comprising:
making the cache data capacity constant when the first write capacity is greater than or equal to a threshold.

18. The method of claim 13, further comprising:
decreasing the cache data capacity when the first write capacity is decreased.

19. The method of claim 18, further comprising:
increasing a second write capacity of data which can be written to the first region by the conventional magnetic recording when the first write capacity is decreased.

20. The method of claim 13, further comprising:
setting the cache data capacity so as to be a first value greater than 0 when the first write capacity is 0.

* * * * *